(12) United States Patent
Nishimura et al.

(10) Patent No.: US 6,345,499 B1
(45) Date of Patent: Feb. 12, 2002

(54) CATALYST LIGHT-OFF METHOD AND DEVICE FOR DIRECT INJECTION ENGINE

(75) Inventors: Hirofumi Nishimura; Youichi Kuji; Seiko Kono; Hiroyuki Yamashita; Keiji Araki, all of Fuchu-cho (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/509,605

(22) PCT Filed: Aug. 3, 1999

(86) PCT No.: PCT/JP99/04193

§ 371 Date: Mar. 30, 2000

§ 102(e) Date: Mar. 30, 2000

(87) PCT Pub. No.: WO00/08329

PCT Pub. Date: Feb. 17, 2000

(30) Foreign Application Priority Data

Aug. 3, 1998 (JP) .......................................... 10-232242

(51) Int. Cl.$^7$ ............................................... F01N 3/00
(52) U.S. Cl. ........................... 60/277; 60/274; 60/285; 60/286; 123/295; 123/299; 123/300
(58) Field of Search .................. 60/284, 285, 286, 60/277, 276; 123/295, 299, 300

(56) References Cited

U.S. PATENT DOCUMENTS

| | | | |
|---|---|---|---|
| 5,482,017 A | | 1/1996 | Brehob et al. |
| 5,642,705 A | * | 7/1997 | Morikawa et al. ........... 123/300 |
| 6,044,642 A | * | 4/2000 | Nishimura et al. ............ 60/285 |
| 6,116,208 A | * | 9/2000 | Nishimura et al. .......... 123/295 |
| 6,141,960 A | * | 11/2000 | Takami et al. ................ 60/286 |

FOREIGN PATENT DOCUMENTS

| | | |
|---|---|---|
| EP | 0 719 937 A | 7/1996 |
| EP | 0 826 869 A | 3/1998 |
| EP | 0 856 655 A | 8/1998 |
| JP | 4-187841 | 7/1992 |
| JP | 4-231645 | 8/1992 |

* cited by examiner

Primary Examiner—Thomas Denion
Assistant Examiner—Binh Tran
(74) Attorney, Agent, or Firm—Nixon Peabody LLP; Donald R. Studebaker

(57) ABSTRACT

A catalyst light-off device for a direct injection engine comprises a temperature state identifier (31) for judging the temperature state of a catalyst (22) for converting exhaust gases, a fuel injection controller (33) for controlling fuel injection from an injector (11), and an ignition timing controller (35). When the catalyst is in its unheated state in which its temperature is lower than its activation temperature, the fuel injection controller (33) causes the injector (11) to make split injection during a period from an intake stroke to an ignition point including a later injection cycle which produces a mixture having local unevenness and an earlier injection cycle which produces a uniform and lean mixture, and the ignition timing controller (35) retards the ignition point.

11 Claims, 14 Drawing Sheets

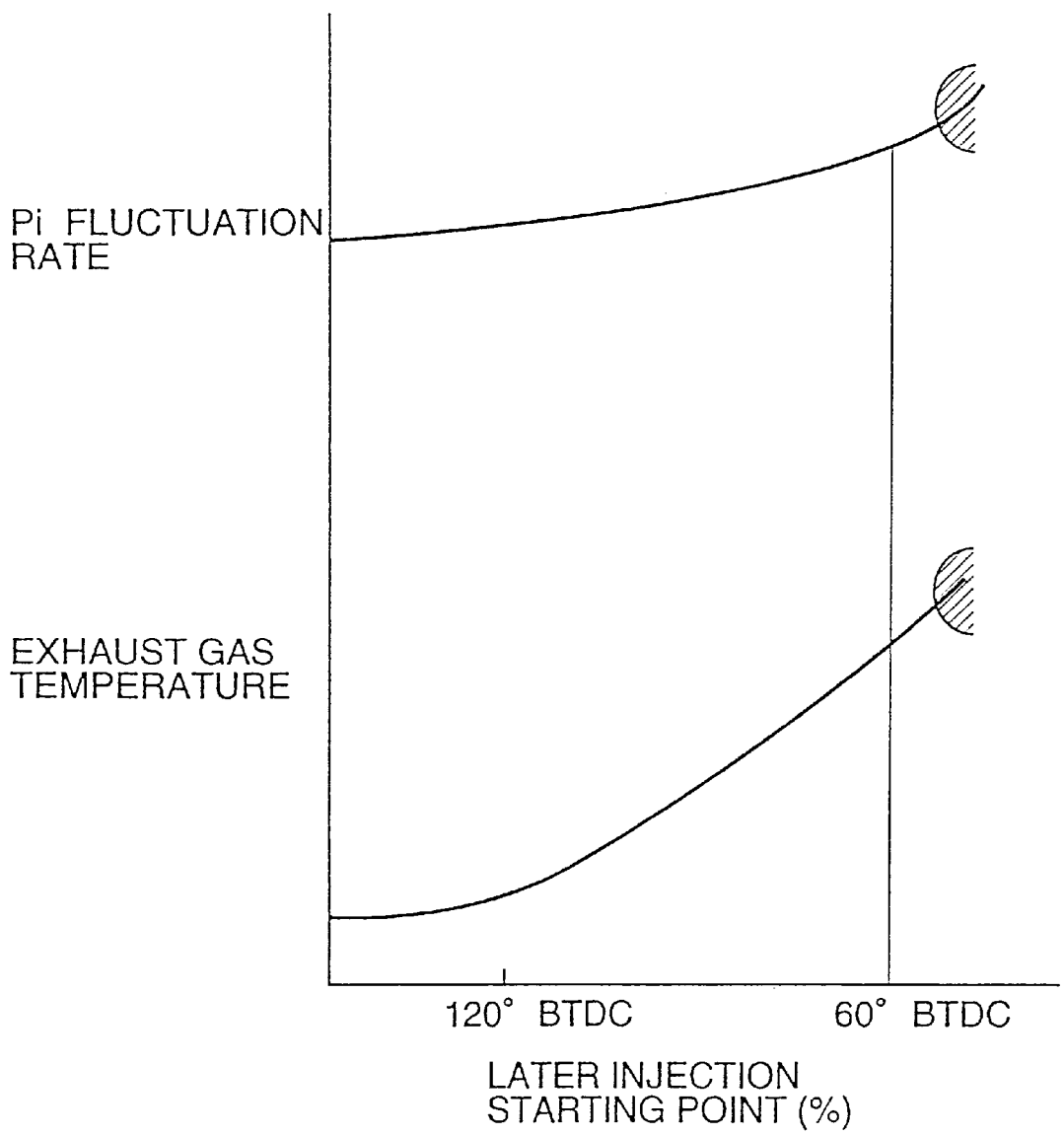

CATALYST LIGHT-OFF METHOD AND DEVICE FOR DIRECT INJECTION ENGINE

TECHNICAL FIELD OF THE INVENTION

This invention relates to a catalyst light-off method and a catalyst light-off device for a direct injection engine provided with an injector for injecting fuel directly into a combustion chamber.

BACKGROUND ART

A direct injection engine having an injector for injecting fuel directly into a combustion chamber is conventionally known. Unlike an arrangement in which an injector is provided in an intake passage, the direct injection engine does not cause a problem of fuel condensation on passage walls and provides excellent air-fuel ratio control stability and response characteristics, for instance. In addition, if the combustion chamber is designed in such a shape that an air-fuel mixture is locally distributed around a spark plug when the fuel is injected in the latter half of each compression stroke, it is possible to increase the air-fuel ratio (leaner mixture) by using so-called stratified charge technology and thereby achieve an improvement in fuel economy.

Exhaust gases from engines of motor vehicles, for instance, contain hydrocarbons (HC), carbon monoxide (CO) and nitrogen oxides (NOx), and there exists a demand today to reduce generation and release of these harmful constituents as much as possible to achieve improved properties of these emissions. One approach that has conventionally been taken is to provide a catalyst in an exhaust passage, and it is a common practice in the aforementioned direct injection engine as well to provide a catalyst in its exhaust passage. A generally known example of such catalyst is a three-way catalyst which has the ability to clean out HC, CO and NOx approximately at the stoichiometric air-fuel ratio. Another example that has already been developed is a catalyst which can clean out NOx even in a "lean" operating range in order to be suited to lean burn operation in the aforementioned direct injection engine or else.

A fuel injection control device disclosed in Japanese Unexamined Patent Publication No. 4-231645, for example, is known as a device for achieving an improvement in conversion efficiency of a catalyst at low temperatures, for instance, in this type of direct injection engine. In a direct injection engine having a lean NOx catalyst provided in an exhaust passage, the lean NOx catalyst being of a type that requires HC for the reduction of NOx, this device is so arranged as to make primary injection from an injector in a latter part of a compression stroke, and make secondary injection in addition to the aforementioned primary injection to inject a small amount of fuel for supplying HC to the lean NOx catalyst within a period from an intake stroke to an early part of the compression stroke when the temperature of the catalyst is low, or make the aforementioned secondary injection in addition to the aforementioned primary injection within a period from a latter half of a combustion stroke to an early part of an exhaust stroke when the temperature of the catalyst is high. In this device, HC derived from the fuel injected by the secondary injection is supplied to the catalyst in the exhaust passage by setting the amount of fuel injected by the secondary injection to such a small level that will scarcely affect combustion within a combustion chamber, and a low boiling-point constituent of HC is supplied to the catalyst in low-temperature conditions and a high boiling-point constituent of HC is supplied to the catalyst in high-temperature conditions by varying the timing of secondary injection in low-temperature and high-temperature conditions in the aforementioned manner.

A catalyst for exhaust gas conversion can not fully exhibit its converting effects when the catalyst is not heated yet and the catalyst temperature is lower than its activation temperature. HC and NOx are likely to be released in large quantities in such a case. Although there exists known technology for overcoming this problem, in which HC and NOx are reduced and catalyst quick light-off operation is performed as a result of an increase in exhaust gas temperature by retarding ignition timing, retardation of the ignition timing tends to cause deterioration in combustion stability and, therefore, the amount of retard of the ignition timing has been limited in order to ensure the combustion stability. Accordingly, it is required to achieve a reduction of HC and NOx and an increase in the exhaust gas temperature, without exclusively relying on the retardation of the ignition timing, and to increase permissible range of ignition timing retardation by increasing the combustion stability. These requirements have not been sufficiently met, however, in the conventional direct injection engine.

Although the device disclosed in the aforementioned Publication is intended to achieve an improvement in low-temperature catalyst performance by making, in addition to the primary injection during the latter part of the compression stroke, the secondary injection preceding the primary injection when the temperature of the catalyst is low, the amount of fuel injected by this secondary injection is extremely small and is delivered to the catalyst in the exhaust passage almost without burning within the combustion chamber. Therefore, this device is advantageous only when a lean NOx catalyst of a type that requires HC for the reduction of NOx is used. Moreover, the device makes it possible to achieve NOx converting effects with the supply of HC only after the catalyst has been activated to a certain degree, though it is still in a low-temperature state, and because HC is released in an earlier unheated state than that point, the device is not favorably suited for achieving an improvement in emissions. Furthermore, the device does not have the function of performing the catalyst quick light-off operation by an increase in the exhaust gas temperature.

Another measure to deal with cold start of a direct injection engine is, as disclosed in Japanese Unexamined Patent Publication No. 4-187841, such that ignitability is maintained by increasing the amount of fuel injected during the compression stroke while the internal temperature of cylinders is low. More specifically, the engine is controlled to make injection during the compression stroke in a low-load range, split injection during the successive intake and compression strokes in a medium-load range and injection during the intake stroke in a high-load range when the engine is in its warm-running condition, whereas the aforementioned range of split injection is extended to the high-load side while the engine is still cold.

This device, however, maintains the ignitability simply by increasing the amount of fuel injected in the compression stroke by as much as an amount corresponding to deterioration of evaporation and atomization while the engine is cold, and the device does not have the ability to accomplish quick light-off and emission improvement by an increase in the exhaust gas temperature while the catalyst is still in its unheated state.

In the light of the above-described circumstances, it is an object of this invention to provide a direct injection engine which reduces the amounts of emissions, such as HC and NOx, from the engine, provides a combustion state enabling the catalyst quick light-off operation by increasing the exhaust gas temperature, and permits increased retardation of the ignition timing by increasing the combustion stability, wherein combined effects thereof make it possible to significantly increase catalyst quick light-off and emission improvement effects.

DISCLOSURE OF THE INVENTION

In a direct injection engine of the invention, an injector is caused to make at least two-step split injection during a period from an intake stroke to an ignition point when a catalyst is in its unheated state, in which its temperature is lower than its activation temperature. In this split injection, a later injection cycle produces a mixture mass having local unevenness in air-fuel ratio in a combustion chamber, while an earlier injection cycle produces a mixture mass which is as uniform and lean as can be ignited by flame propagation by fuel injected in the later injection cycle and combustion thereof, wherein ignition timing is retarded. HC and NOx are reduced and exhaust gas temperature is increased by the split injection. Further, combustion stability is increased, making it possible to further retard the ignition timing. Consequently, HC and NOx reduction and catalyst quick light-off effects can be significantly increased due to a combined effect of the split injection and ignition timing retardation.

BRIEF DESCRIPTION OF THE DRAWINGS

FIG. 17 is a diagram showing variations in Pi fluctuation rate and other parameter observed when later injection start timing is varied in various ways.

BEST MODE FOR CARRYING OUT THE INVENTION

Figure 1:
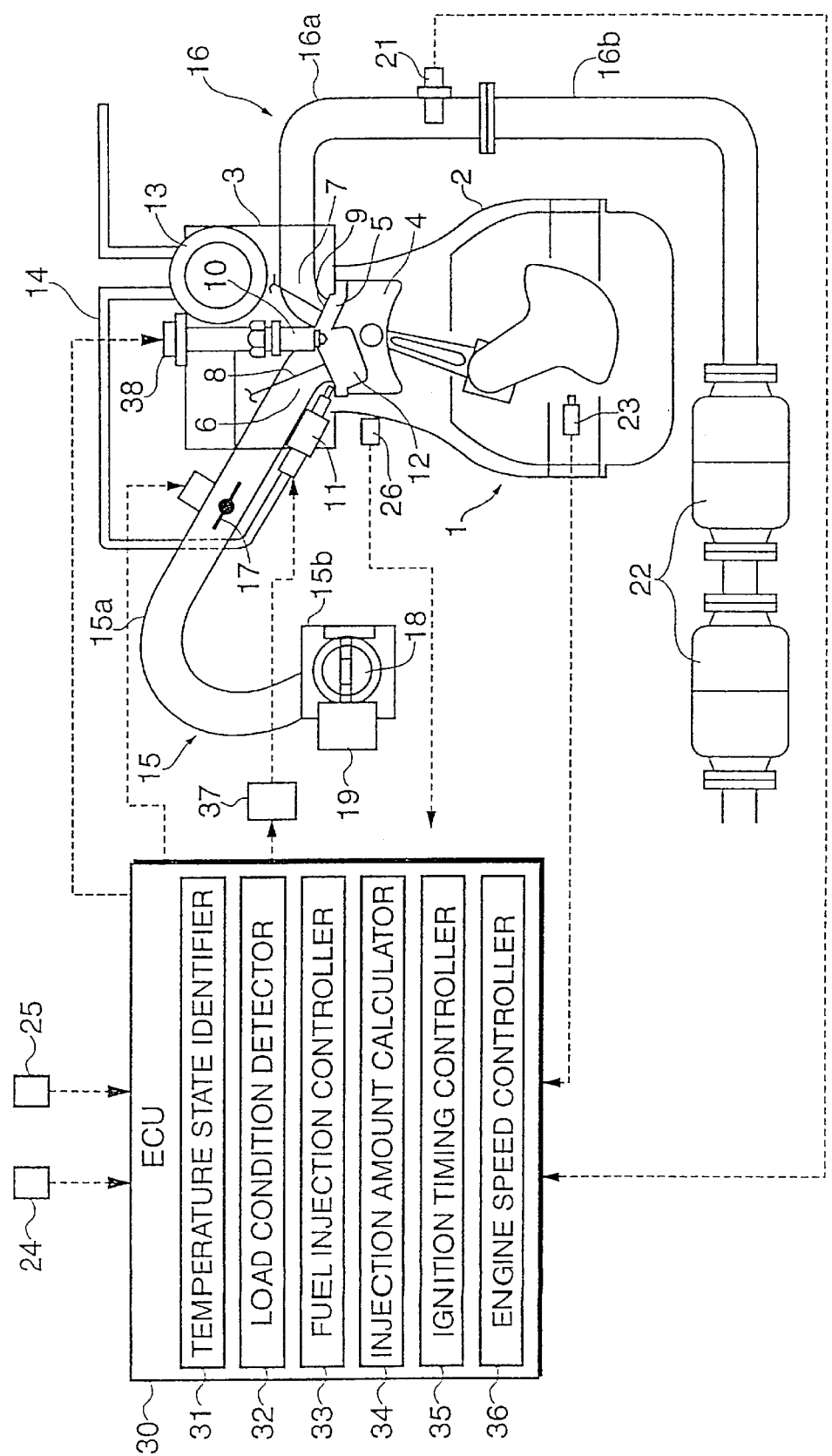
FIG. 1 is a general configuration diagram showing a direct injection engine according to an embodiment of the invention.

FIG. 1 shows a practical example of a direct injection engine. In this Figure, designated by the numeral 1 is a main engine body which includes a cylinder block 2 and a cylinder head 3 in which a plurality of cylinders are formed. A piston 4 is fitted in each cylinder and a combustion chamber 5 is formed between the top surface of the piston 4 and the bottom surface of the cylinder head 3.

Their construction is now explained in a specific manner. A recess having a particular shape is formed in the bottom surface of the cylinder head 3, the recess forming an upper interior surface of the combustion chamber 5. For example, the upper interior surface of the combustion chamber 5 is formed into a pent-roof shape as illustrated, and intake ports 6 and exhaust ports 7 opening into the combustion chamber 5 are formed in its upper interior surface. Although one each intake port 6 and exhaust port 7 are shown in the Figure, two each intake ports 6 and exhaust ports 7, individually arranged in a direction perpendicular to the page of the Figure, are provided in a preferred form. Then, an intake valve 8 and an exhaust valve 9 are provided in each intake port 6 and exhaust port 7, respectively. Driven by an unillustrated valve actuator, the intake valves 8 and the exhaust valves 9 are caused to open and close with specified timing.

Spark plugs 10 are fitted in the cylinder head 3 in such a way that each spark plug 10 is located approximately at the middle of the combustion chamber 5 with its spark gap thrust into the combustion chamber 5.

An injector 11 which injects fuel directly into the combustion chamber 5 is provided at a peripheral part of the combustion chamber 5. In the embodiment shown in FIG. 1, the injector 11 is attached to the cylinder head 3 at the side of the combustion chamber 5 near the intake port 6, and the injector 11 is disposed such that it injects the fuel obliquely downward with the far end of the injector 11 located in the inner space of the combustion chamber 5.

Also in the illustrated embodiment, the top surface of the piston 4 constituting the bottom side of the combustion chamber 5 is formed into a generally flat shape. Therefore, unlike a later-described piston having a cavity for mixture capturing (shown in FIG. 6), the piston 4 does not have the function of capturing a mixture and gathering it around the spark plug when the fuel is injected from the aforementioned injector 11 toward the top surface of the piston 4 when the piston 4 is situated at a position close to the top dead center.

Further, a high-pressure pump 13 is connected to the aforementioned injector 11 through a fuel-feeding passage 14. The high-pressure pump 13 and a high-pressure regulator which is disposed in an unillustrated return passage jointly adjust fuel pressure exerted on the injector 11 to such a high pressure level that is sufficient to enable fuel injection in a middle portion of a compression stroke or later.

An intake passage 15 and an exhaust passage 16 are connected to the aforementioned main engine body 1. The aforementioned intake passage 15 branches out downstream of a surge tank 15b to the individual cylinders, whereby two branched passages 15a (of which only one is shown in the Figure) running parallel to each other are formed for each cylinder. The two intake ports 6 at the downstream ends of the branched passages 15a open into the combustion chamber 5, and a swirl control valve 17 serving as turbulence enhancing means is provided in one of these branched passages 15a. When the swirl control valve 17 is closed, a swirl is produced in the combustion chamber 5 by intake air inducted through the other branched passage 15a so that the turbulence within the combustion chamber 5 is enhanced.

As an alternative turbulence enhancing means, a valve which produces a tumble may be provided in one branched passage instead of the swirl control valve 17, or there may be made such an arrangement that a squish is produced between the top surface of the piston and the upper interior surface of the combustion chamber (bottom surface of the cylinder head) near the top dead center of the compression stroke.

Further, a throttle valve 18 is provided halfway in the intake passage 15 and this throttle valve 18 is made controllable by an electrically driven actuator 19 like a stepper motor to permit control of the amount of intake air.

An exhaust gas recirculation (EGR) passage (not shown) is connected to the surge tank 15b via an EGR valve (not shown) to make it possible to introduce EGR gas upon completion of engine light-off.

On the other hand, a carbon dioxide ($O_2$) sensor 21 and a catalytic converter 22 containing catalysts for converting exhaust gases are provided in the exhaust passage 16. The above-mentioned $O_2$ sensor 21 detects the air-fuel ratio of a mixture in the combustion chamber by measuring the concentration of oxygen and is made of a sensor ($\lambda O_2$ sensor) whose output varies at the stoichiometric air-fuel ratio.

While the catalytic converter 22 may be formed of a three-way catalyst, it is desirable to use catalysts capable of reducing NOx contained even in a lean mixture having a higher air-fuel ratio than the stoichiometric air-fuel ratio because there can arise a case in which the engine is operated with a lean mixture whose air-fuel ratio has been increased after light-off operation, as will be described later. More specifically, while the three-way catalyst exhibits high conversion efficiency against all three pollutants HC, CO and NOx only in the vicinity of the stoichiometric air-fuel ratio as is commonly known, there exists a catalyst (lean NOx catalyst) which not only performs the same function as the three-way catalyst but also reduces NOx even in a lean mixture having a higher air-fuel ratio than the stoichiometric air-fuel ratio. Thus, it is preferable to reduce NOx by using this catalyst under lean operating conditions. It is to be noted, however, that this kind of lean NOx catalyst also exhibits its maximum conversion efficiency in the vicinity of the stoichiometric air-fuel ratio.

Since the catalytic converter 22 contains the lean NOx catalyst, the catalyst temperature is likely to increase excessively under high-speed, high-load conditions if the catalytic converter 22 is provided immediately downstream of an exhaust manifold 16a (or directly connected to it). Therefore, the catalytic converter 22 is connected directly to an exhaust pipe 16b which is connected to the exhaust manifold 16a so that the catalytic converter 22 is situated farther away from the main engine body 1 than the position immediately downstream of the exhaust manifold 16a. In a case where the three-way catalyst is used, however, the catalytic converter 22 may be connected directly to the exhaust manifold because the three-way catalyst has heat-resistant properties.

Designated by the numeral 30 is an ECU (electronic control unit) which performs engine control. Signals from a crank angle sensor 23 which detects the crank angle of the engine, an acceleration sensor 24 which detects accelerator opening (i.e., the amount of operation of an accelerator pedal), an airflow meter 25 which detects the amount of intake air, a water temperature sensor 26 which detects the temperature of engine cooling water, the aforementioned $O_2$ sensor 21, etc. are input to the ECU 30.

The aforementioned ECU 30 includes a temperature state identifier 31, a load condition detector 32, a fuel injection controller 33, a fuel injection amount calculator 34, an ignition timing controller 35 and an engine speed controller 36.

The aforementioned temperature state identifier 31 is for estimating the temperature state of the catalyst and judging whether it is in an unheated state, in which its temperature is lower than its activation temperature, based on a temperature sensing signal fed from the aforementioned water temperature sensor 26. If the water temperature is lower than a first set temperature, the temperature state identifier 31 judges that the catalyst is in its unheated state, and if the water temperature is higher than the first set temperature, the temperature state identifier 31 judges that the catalyst is in its heated state. This temperature state judgment operation for determining catalyst light-off condition may be done by performing water temperature detection and a judgment on elapsed time from the point of engine startup at the same time, or by directly sensing the catalyst temperature.

The aforementioned load condition detector 32 senses engine operating conditions by examining the engine speed obtained from a crank angle signal fed from the crank angle sensor 23, etc. and engine load obtained from the accelerator opening, or the amount of intake air, and the engine speed.

The aforementioned fuel injection controller 33 is for controlling fuel injection timing and the amount of fuel to be injected from the injector 11 through an injector driving circuit 37. When the catalyst is in its unheated state, the fuel injection controller 33 controls the injector 11 to make split injection including at least two injection cycles during a period from an intake stroke to an ignition point at least in a low-load operating range of the engine, the two injection cycles including later injection performed in the middle portion of the compression stroke or later and earlier injection performed prior to the later injection.

The aforementioned split injection may be made in all engine operating ranges when the catalyst is in its unheated state, or fuel injection may be made in the intake stroke only in a high-load range to meet requirements with respect to engine output.

Figure 2:
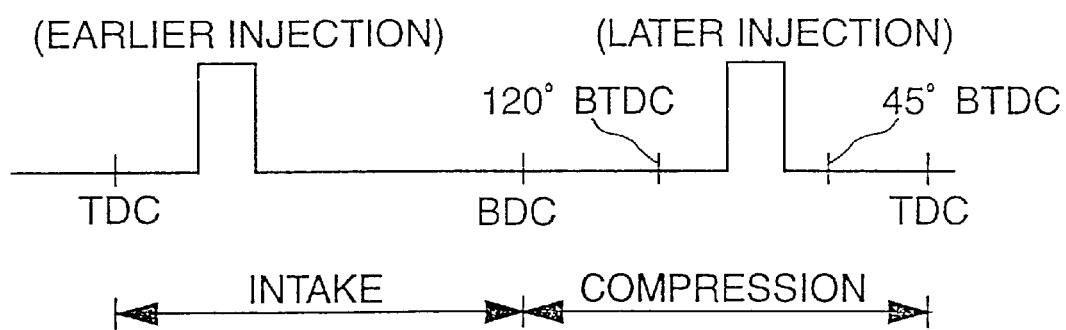
FIG. 2 is a diagram showing injection points of earlier injection and later injection in split injection.

Preferable injection timing is such that the aforementioned earlier injection is made during the intake stroke and the aforementioned later injection is made during the compression stroke, as shown in FIG. 2. It is particularly preferable to commence the later injection in the middle portion of the compression stroke or later but before three-fourths of the period of the compression stroke elapses.

Here, the middle portion of the compression stroke refers to an intermediate part of the compression stroke as it is divided into three equal portions, that is, the earlier, middle and later portions. Accordingly, the period from the middle portion of the compression stroke or later but before three-fourths of the period of the compression stroke elapses means a period from the point of 120° before the top dead center (BTDC) to the point of 45° BTDC. The reason why the later injection should preferably be commenced in this period is that combustion stability is impaired if the later injection timing is later than this period, whereas NOx reduction and exhaust gas temperature increasing effects are not obtained if the later injection timing is earlier than this period.

In such split injection performed when the catalyst is in its unheated state, the amount of fuel to be injected is calculated by the fuel injection amount calculator 34 such that the air-fuel ratio falls within a set air-fuel ratio range of 13 to 17, and the amount of fuel to be injected is divided with specific proportions by the aforementioned fuel injection controller 33, whereby the amounts of fuel injected by earlier injection and later injection are controlled.

In the above operation, either of the aforementioned earlier injection and later injection cycles is so controlled as to inject fuel which will contribute to main combustion which occurs within a main combustion period. Generally, in a combustion process occurring within a combustion chamber, a period in which up to about 10% of the injected fuel in terms of mass is burnt is called an initial combustion period and a period in which from about 10% to 90% of the injected fuel is burnt is called the main combustion period. As will be explained later again, initial combustion in which fuel injected by later injection is ignited and burnt is a combustion cycle encompassing the initial combustion period and an earlier part of the main combustion period. The amounts of fuel injected in the individual injection cycles are set in such a way that the fuel injected by earlier injection creates a mixture having an air-fuel ratio capable of flame propagation by combustion of the fuel injected by later injection within the combustion chamber so that both proportions of fuel injected by earlier injection and later injection contribute to main combustion, and the lean mixture produced from the fuel injected by earlier injection is slowly burnt.

In other words, the amounts of fuel injected in the individual injection cycles are controlled such that a mixture mass in which part of the fuel injected by earlier injection and part of the fuel injected by later injection are mixed can burn as a result of flame propagation by combustion of the fuel injected by later injection, even though the fuel injected by earlier injection can not burn alone. Specifically, the proportions of the injected fuel are set such that the air-fuel ratio within the combustion chamber obtained by earlier injection alone becomes 70 or less to achieve an air-fuel ratio capable of flame propagation from a flame caused by combustion of the fuel injected by later injection. The proportion of fuel injected by earlier injection is made equal to ⅕ or more (i.e., the proportion of fuel injected by later injection is ⅘ or less) of the total amount of the injected fuel.

Also, the proportion of fuel injected by later injection is made equal to ⅕ or more (i.e., the proportion of fuel injected by earlier injection is ⅘ or less) of the total amount of the injected fuel. Thus, the proportion of fuel injected by earlier injection falls within a range of ⅕ to ⅘. More preferably, the amount of fuel injected by earlier injection is set such that the air-fuel ratio within the combustion chamber obtained by earlier injection alone becomes equal to or higher than the flammability limit air-fuel ratio (i.e., a limit of air-fuel ratio at which a mixture can be burnt by itself: approximately 30) within the aforementioned range.

It is preferable that the air-fuel ratio within the entire combustion chamber be set, within the aforementioned range of 13 to 17, to a level equal to or slightly higher than the stoichiometric air-fuel ratio. The earlier-mentioned injection amount calculator calculates the amount of fuel to be injected in such a way that the air-fuel ratio within the entire combustion chamber will match the set air-fuel ratio by way of open-loop control or feedback control based on the output from the $O_2$ sensor, as will be described later in greater detail.

Further, the aforementioned ignition timing controller 35 outputs a control signal to an ignition device 38 and thereby controls the ignition timing according to operating conditions of the engine. Although the ignition timing is essentially controlled to achieve a minimum spark advance for best torque (MBT), it is retarded by a specified amount when the aforementioned split injection is performed while the catalyst is in its unheated state at least in a low-speed, low-load range.

The engine speed controller 36 controls the amount of intake air or the ignition point, for instance, in such a way that the engine idling speed becomes higher when the catalyst is in its unheated state than after the catalyst has been heated.

The aforementioned ECU 30 is so constructed as to control the amount of intake air as well by outputting a control signal to the actuator 19 for driving the throttle valve 18. Specifically, the ECU 30 controls the opening of the throttle valve 18 according to the accelerator opening when the engine is operated at the stoichiometric air-fuel ratio in a high-load range, for instance, when the catalyst is in its unheated state or has already been heated, whereas the ECU 30 controls the throttle valve 18 to open to increase the amount of intake air and thereby increase the air-fuel ratio when stratified charge combustion is made by injecting the fuel solely in the compression stroke in a low-load range, for instance, after light-off. Further, the ECU 30 controls the aforementioned swirl control valve 17 to produce a swirl within the combustion chamber 5 when the aforementioned split injection is performed while the catalyst is in its unheated state, for instance.

Figure 3:
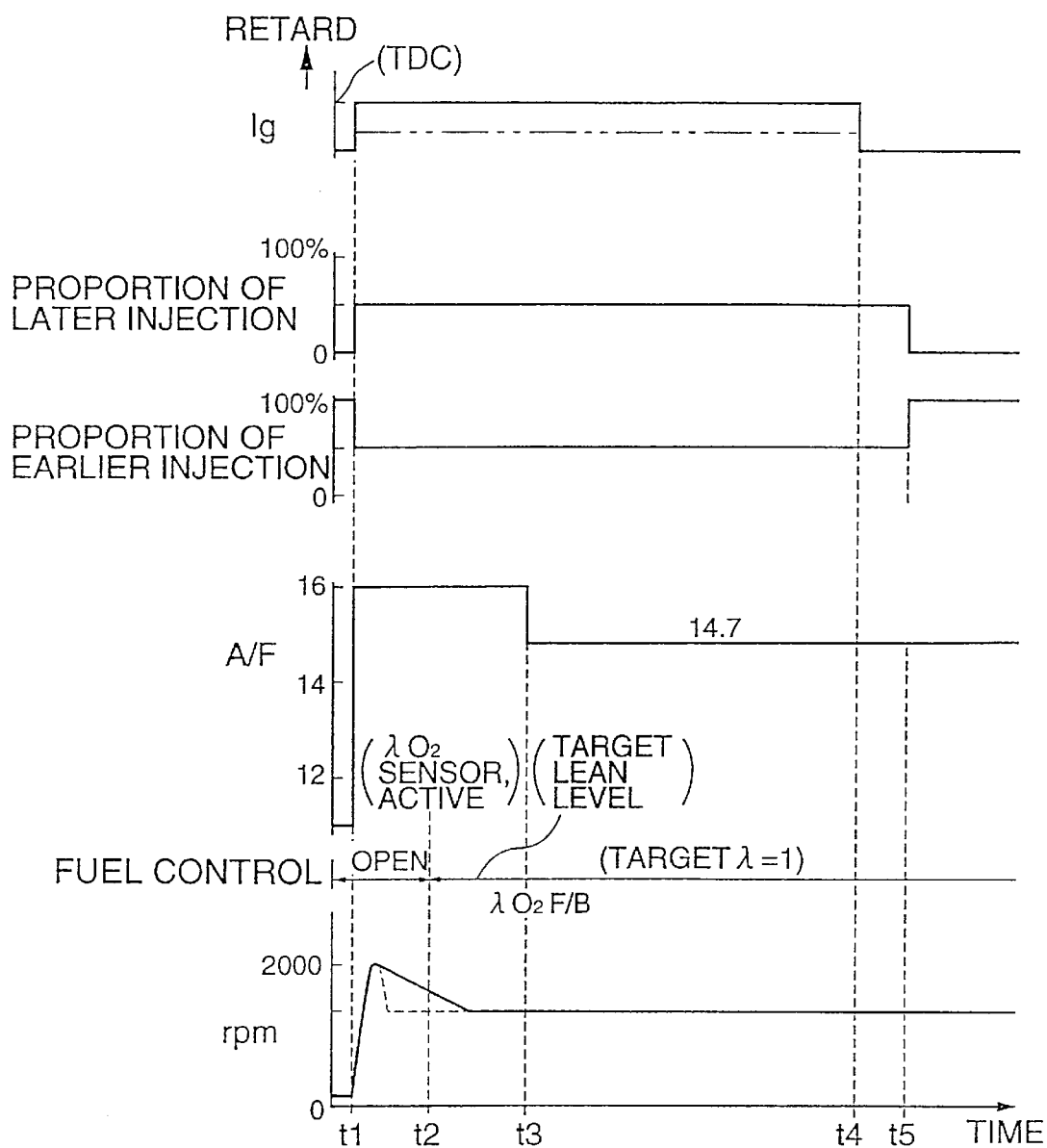
FIG. 3 is a time chart showing an example of control operation.

An example of control operation of this direct injection engine is now described referring to a time chart of FIG. 3.

In FIG. 3, $t_1$ designates the point in time of the end of engine startup operation. Up to the time $t_1$ during the engine startup operation, the air-fuel ratio is held at a lower level (richer mixture) than the stoichiometric air-fuel ratio to maintain startup torque, for instance, and fuel injection from the injector 11 is made in the intake stroke only (intake stroke injection). The reason for this arrangement is that fuel injection in the compression stroke (compression stroke injection), if performed during the engine startup operation, is likely to cause poor evaporation and atomization and eventual misfire due to wetting of the spark plug by the fuel and, therefore, it is desirable to make intake stroke injection to allow for time for fuel evaporation and atomization. In addition, the ignition timing is adjusted to the point of MBT.

Split injection is made when the catalyst remains in its unheated state beyond the engine startup end point $t_1$. More particularly, fuel injection from the injector 11 is made in two separate parts, that is, earlier injection performed during the intake stroke and later injection performed in the middle portion of the compression stroke or later. In the example shown in FIG. 3, equal proportions of fuel are allocated to the earlier injection and later injection cycles.

In this split injection mode, the air-fuel ratio within the entire combustion chamber is set to fall within a range of 13 to 17. In the example shown in FIG. 3, the air-fuel ratio is set to a higher level (leaner mixture) than the stoichiometric air-fuel ratio during a specified time period ($t_1$ to $t_3$) immediately following engine startup, where the catalyst temperature is particularly low within the total period when the catalyst is in its unheated state. While the amount of fuel to be injected is calculated according to the amount of intake air by open-loop control until the $O_2$ sensor 21 is activated, the amount of fuel to be injected is calculated by feedback control based on the output from the $O_2$ sensor 21 from time $t_2$ aiming at a "lean" air-fuel ratio when the catalyst $O_2$ sensor 21 has been activated. From time $t_3$ when a specified time period has elapsed, feedback control based on the output from the $O_2$ sensor 21 is made aiming at the stoichiometric air-fuel ratio ($\lambda=1$).

Figure 4:
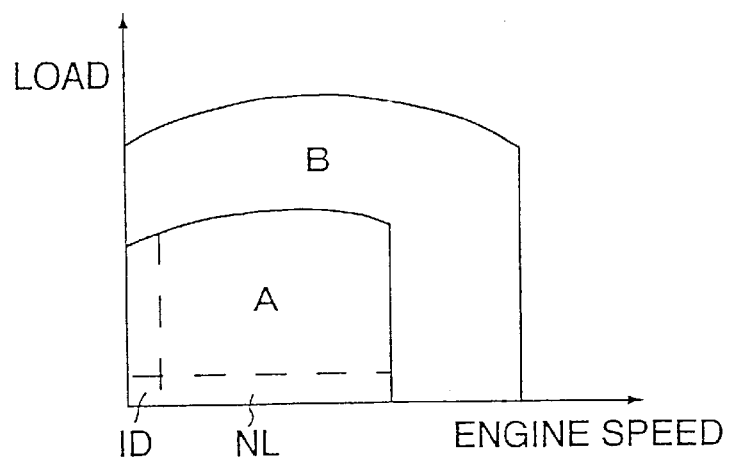
FIG. 4 is a diagram showing operating range settings for ignition timing control, for example.

Further, the ignition timing is retarded while the catalyst is in its unheated state. In this case, the amount of ignition timing retardation is varied according to operating ranges shown in FIG. 4. More particularly, in the low-speed, low-load range A excluding a no-load range NL, the ignition timing is retarded to or beyond the top dead center, and the amount of retardation increases as the load increases in this range. In a range B of higher load than the range A (or in a high-load range of a specified load or over), the amount of ignition timing retardation is caused to decrease and approach the MBT as the load increases. The amount of ignition timing retardation is reduced in the no-load range as well so that the ignition point is located ahead of the top dead center. In FIG. 4, "ID" designates an idling speed range.

While the ignition timing is advanced toward the MBT side (or retardation is canceled) and the aforementioned split injection mode is canceled when the catalyst temperature has increased, these switching operations are made with some time lag to alleviate torque shocks. Especially because ignition timing retardation is rather disadvantageous than the aforementioned split injection mode in terms of fuel economy (see later-discussed FIGS. 13A to 13D), the ignition timing is advanced at time t4 when the catalyst temperature has increased to a certain extent and, then, the split injection mode is canceled at time $t_5$ when the catalyst has been heated. As an alternative, the advancement of the ignition timing toward the MBT side and cancellation of the split injection mode may be made at the same time.

The engine speed is controlled to match an engine idling speed which is set in accordance with engine cooling water temperature, for instance, upon engine startup. Conventionally, the engine speed is quickly reduced to an ordinary engine idling speed corresponding to the engine cooling water temperature immediately after engine startup as shown by broken lines. In this embodiment, however, the engine speed is controlled such that it becomes higher than the ordinary engine idling speed corresponding to the engine cooling water temperature by correcting a target engine speed, for instance, immediately after engine startup when the engine is not heated yet and, then, the engine speed is caused to gradually decrease down to the ordinary engine idling speed. The combustion stability is enhanced and an ignition timing retarding limit is increased as the engine speed is increased immediately after engine startup in the above-described manner.

In the engine shown in FIG. 1, each piston 4 is a flat piston which does not necessarily stratify the mixture. In this engine (hereinafter referred to as the non-stratified charge engine), fuel is injected in the intake stroke and uniform combustion is performed after the catalyst has been heated. Although uniform combustion may be made at $\lambda=1$ in all operating ranges, it may be made at a "lean" air-fuel ratio in the low-speed, low-load range.

In this Description, a "flat piston" refers to a piston which is not provided with a cavity 12 for capturing a mixture for stratified charge formation. Thus, flat pistons are not limited to those having a completely flat top like the one shown in FIG. 1 or FIG. 5($a$) but include those having a recessed or protruding top surface to obtain a combustion chamber shape to meet requirements, such as pistons 41, 43 shown in FIGS. 5B–5C, as long as such recessed or protruding top shape is not intended for stratified charge formation.

Figure 6:
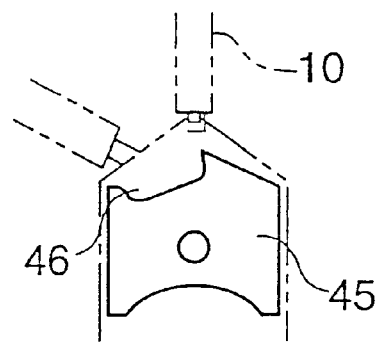
FIG. 6 is a diagram showing a piston for a stratified charge engine.

A piston 45 having a stratified charge-forming cavity 46 in its top as shown in FIG. 6 may be used instead of the aforementioned flat piston. Since the cavity 46 traps the fuel injected from the injector 11 and redirects it toward the spark plug 10, a stratified charge state in which a relatively rich mixture is locally distributed in the vicinity of the spark plug 10 is obtained when fuel injection from the injector 11 is made in the middle portion of the compression stroke or later. In this type of engine (hereinafter referred to as the stratified charge engine) designed to have the ability to obtain the stratified charge state, mode of fuel injection is controlled such that stratified charge combustion or uniform combustion, for example, is performed according to operating conditions after the catalyst has been heated. In the low-speed, low-load range, for example, the fuel injection mode is switched to compression stroke injection and the air-fuel ratio is increased (lean mixture) to perform stratified charge combustion, whereas in the high-speed or high-load range, the fuel injection mode is switched to intake stroke injection. Furthermore, in a region between a stratified charge combustion region and a uniform combustion region in a medium-load range, there are cases where split injection is made encompassing the intake and compression strokes as required to prevent a sudden change in torque.

Of fuel control operations among the control operations shown in the aforementioned time chart, the feedback control performed under lean conditions during a time period $t_2$ to $t_3$ and the feedback control performed at the time $t_3$ or later are explained with reference to FIGS. 7 and 8.

Figure 7:
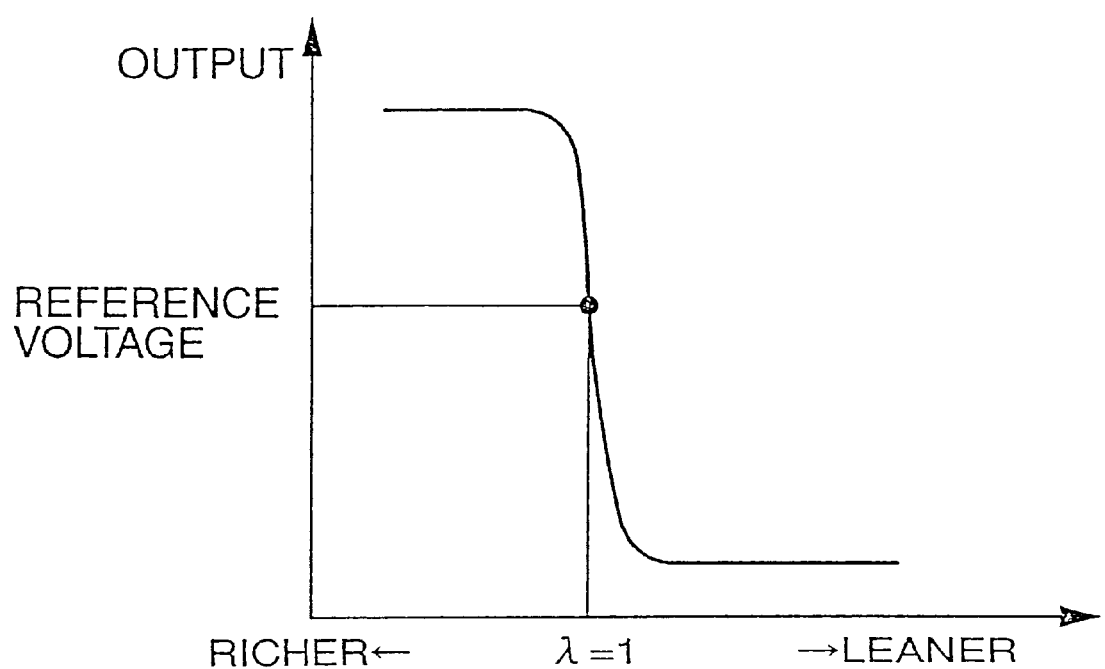
FIG. 7 is a diagram showing an output of an $O_2$ sensor.
Figure 8:
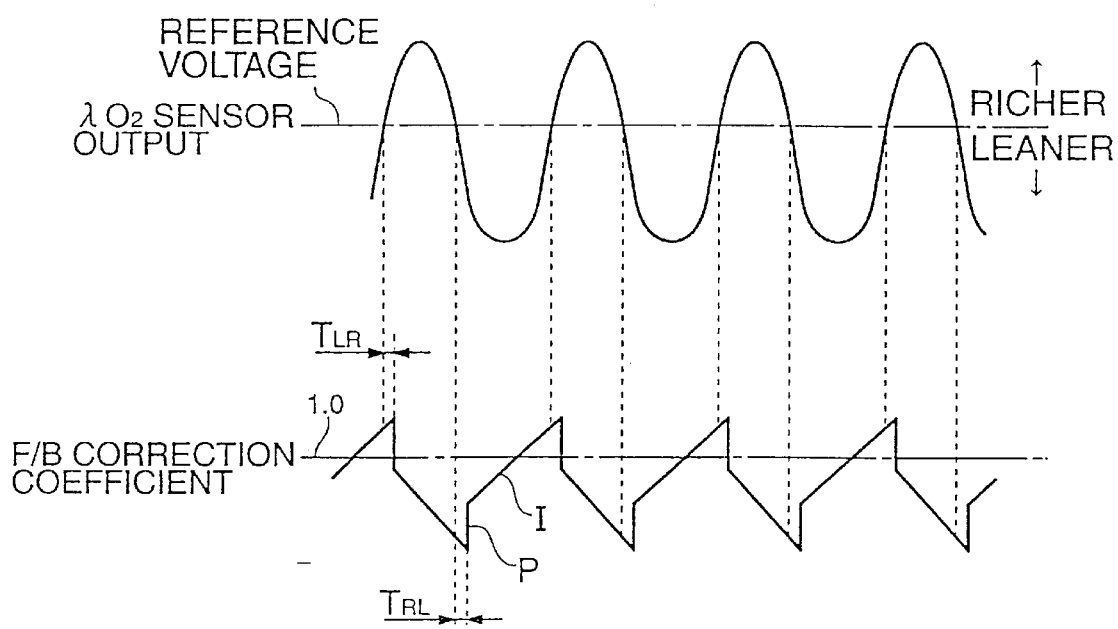
FIG. 8 is a diagram showing variations in the output of the $O_2$ sensor observed when feedback control of the air-fuel ratio is performed and corresponding variations in a feedback correction coefficient.

The output of the aforementioned $O_2$ sensor 21 suddenly changes at the stoichiometric air-fuel ratio ($\lambda=1$) as shown in FIG. 7. Generally in the feedback control based on the output of the $O_2$ sensor 21, a feedback correction coefficient applied to the amount of injected fuel is made variable by a P value which is a constant of proportionality and an I value which is an integration constant as shown in FIG. 8, wherein only one constant, the P value or I value, is varied in a direction of decreasing the amount of injected fuel when the output of the $O_2$ sensor 21 indicates a rich state, whereas only one constant, the P value or I value, is varied in a direction of increasing the amount of injected fuel when the output of the $O_2$ sensor 21 indicates a lean state. In addition, delay times $T_{RL}$ and $T_{LR}$ are set to allow inversion of the feedback correction coefficient when the output of the $O_2$ sensor 21 is inverted from the rich state to the lean state, and from the lean state to the rich state, respectively.

When fuel injection is to be controlled to obtain a specific air-fuel ratio to the "lean" side of the stoichiometric air-fuel ratio during the time period $t_2$ to $t_3$ in the aforementioned feedback control, the delay time $T_{RL}$ is so adjusted that it becomes larger than the delay time $T_{LR}$, causing the average value of the feedback correction coefficient to be shifted to the direction of decreasing the amount of injected fuel. As a consequence, the air-fuel ratio is adjusted in such a way that it is shifted to the "lean" side of the stoichiometric air-fuel ratio. Similar adjustment is possible also by differentiating the aforementioned P or I value depending on whether the output of the $O_2$ sensor 21 indicates the rich state or the lean state.

In the feedback control operation from the time $t_3$, the delay times $T_{RL}$ and $T_{LR}$ are adjusted to the same settings on the "rich" side and the "lean" side to thereby carry out ordinary control operation in which the air-fuel ratio is adjusted to the stoichiometric air-fuel ratio.

Operational features of the above-described direct injection engine of the present embodiment are described in the following.

If the catalyst is in its unheated state upon engine startup, fuel injection from the injector is made in two separate parts, that is, earlier injection performed during the intake stroke and later injection performed in the middle portion of the compression stroke or later while controlling the amount of fuel to be injected so as to produce an air-fuel ratio approximately equal to or slightly higher than the stoichiometric air-fuel ratio within the entire combustion chamber at least in the low-load range.

The fuel injected by the earlier injection spreads throughout the entire combustion chamber and creates a mixture layer which is lean but capable of flame propagation, because a sufficient time is available for evaporation, atomization and spreading prior to ignition. The fuel injected by the later injection causes a mixture having a relatively low air-fuel ratio to exist at least in the vicinity of the spark plug 10. Especially in the stratified charge engine shown in FIG. 1, the fuel injected by the later injection is caused to gather at a high concentration around the spark plug and, as a consequence, a stratified charge state in which a mixture layer having an air-fuel ratio equal to or higher than the stoichiometric air-fuel ratio is formed is obtained.

As such fuel supply conditions are created, ignition and combustion of the mixture are made in a desirable fashion, HC and NOx in the exhaust gases released from the engine are reduced, resulting in an improvement in emissions while the catalyst is in its unheated state, and the exhaust gas temperature increases so that catalyst quick light-off operation is performed. These advantageous effects are specifically explained referring to FIGS. 9 to 17. Split injection referred to in FIGS. 9 to 17 means split injection in which earlier injection is made during the intake stroke and later injection is made during the compression stroke as shown in the foregoing embodiment.

Figure 9:
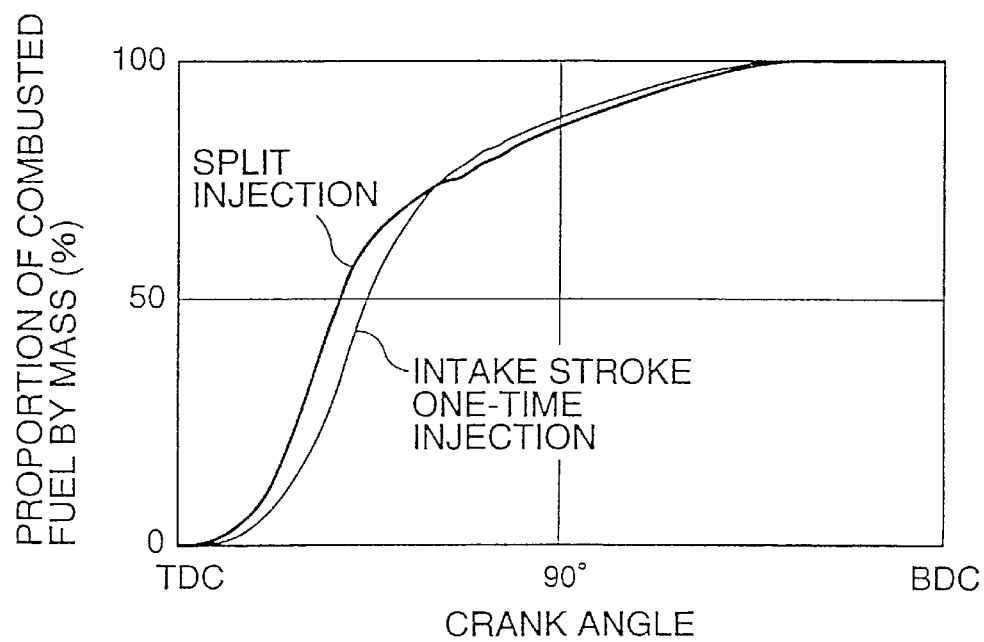
FIG. 9 is a diagram showing variations in the proportion by mass of combusted fuel observed when split injection was conducted and when one-time injection was conducted in an intake stroke.

FIG. 9 shows data on variations in the proportion by mass of combusted fuel after ignition examined when split injection was made and when intake stroke one-time injection (comparative example) was made under the following operating conditions:

Engine speed: 1500 rpm

Brake mean effective pressure (Pe): 294 kPa

Ignition timing: Retarded to top dead center (TDC) on compression stroke (in which MBT is about 10° BTDC.)

As show in this Figure, the proportion by mass of combusted fuel rises more quickly and burning in a latter part of a combustion period becomes slower in the split injection than in the one-time injection of th e aforementioned comparative example. Reasons why such a phenomenon occurs are supposed to be as follows.

Figure 5A:
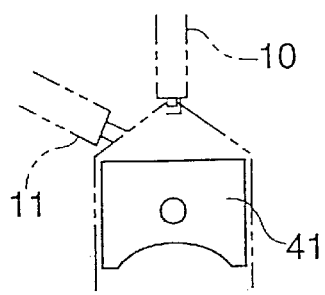
FIGS. 5A–5C are diagrams showing variations of pistons for the direct injection engine.
Figure 5B:
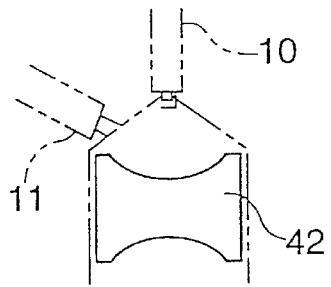
Figure 5C:
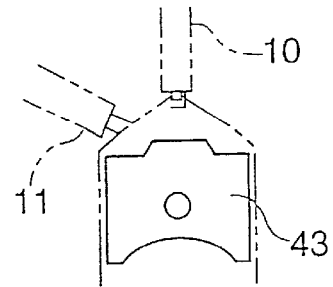
Figure 10:
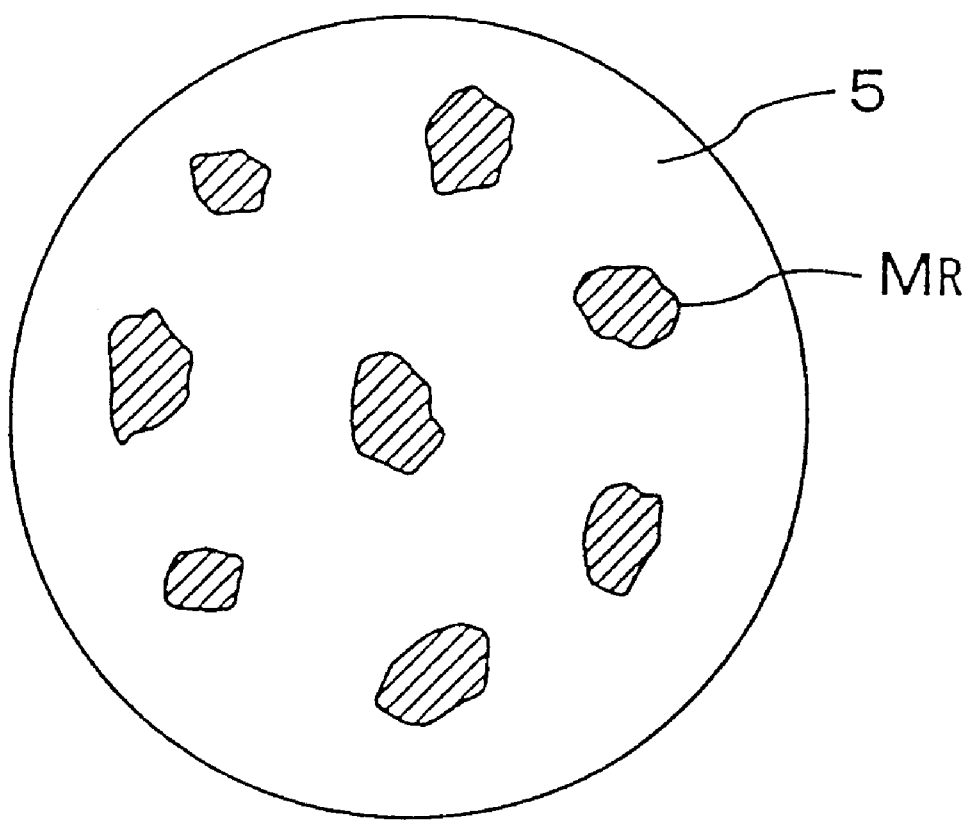
FIG. 10 is a explanatory diagram showing a condition in which mixture masses are dispersed in a combustion chamber by split injection.

Here, it is assumed that the aforementioned split injection is performed in a non-stratified charge engine employing flat pistons as shown in FIG. 1 (or FIG. 5). The time period from the later injection in the middle portion of the compression stroke or later to the point of ignition is so short that the fuel is not dispersed in a completely uniform fashion, if not stratified, and a mixture having local unevenness is produced in the combustion chamber. Specifically, a condition in which mixture masses $M_R$ locally richer than other portions are scattered in the combustion chamber is created as shown in FIG. 10. Because locally rich mixture masses exist near the spark plug as well in this condition, ignition and combustion are made satisfactorily. Since relatively rich mixture masses and lean mixture masses are scattered in this condition, the flame propagation velocity becomes uneven and irregular recesses and protrusions are formed in a flame front in the process of flame propagation. It is supposed that burning in the earlier part of combustion is accelerated because the aforementioned unevenness increases the surface area of the flame and contributes to acceleration of combustion, Further, the fuel injected by earlier injection, mixed with part of the fuel injected by latter injection, creates a uniform and lean mixture and this lean mixture is burnt. In other words, the flame propagates from a first-burning relatively rich mixture to the lean mixture, causing the lean mixture to burn slowly. Thus, it is supposed that slow combustion occurs in a latter half of each combustion stroke.

The stratified charge engine employing the piston 45 having the cavity 46 shown in FIG. 6 also has the same tendency to produce slow combustion in the latter half of the combustion stroke when split injection is made. It also shows a tendency that the proportion by mass of combusted fuel rises more quickly when the degree of stratification is relatively low. More specifically, when the aforementioned split injection is performed, the mixture produced by the fuel injected by the later injection is locally distributed around the spark plug and there is produced unevenness even within the locally distributed region because the time period from the later injection to ignition is so short. There exist a relatively rich mixture and lean mixture around the spark plug when the degree of stratification is relatively low. This makes the flame propagation velocity uneven, causing an increase in the surface area of the flame, and as a consequence, burning in the earlier part of combustion is accelerated. Further, since the lean mixture is formed in an outer area of the combustion chamber, slow combustion occurs in the latter half of the combustion stroke. Discussed above is what would supposedly occur in the stratified charge engine.

The combustion by split injection as shown in FIG. 9 produces such effects as a reduction of HC and NOx, an increase in exhaust gas temperature, and an increase in the permissible range of ignition timing retardation during the period when the catalyst is in its unheated state.

More specifically, prolonged burning in a latter half of the combustion period by the aforementioned split injection serves to increase the exhaust gas temperature and burn and reduce HC emissions. Furthermore, slow burning in the latter half of the combustion period results in a reduction of NOx as well.

Moreover, accelerated rising of the proportion by mass of combusted fuel leads to acceleration of burning in a first half of the combustion period and an increase in combustion stability. When the combustion stability is increased in this fashion, it becomes possible to increase the amount of retardation of the ignition timing. It is understood from the foregoing that HC and NOx are more reduced and the exhaust gas temperature is more increased in the split injection than in the one-time injection, even when the amount of retardation is the same. Furthermore, as the amount of ignition timing retardation is increased, quick light-off and HC and NOx reduction effects are even more increased.

Figure 11:
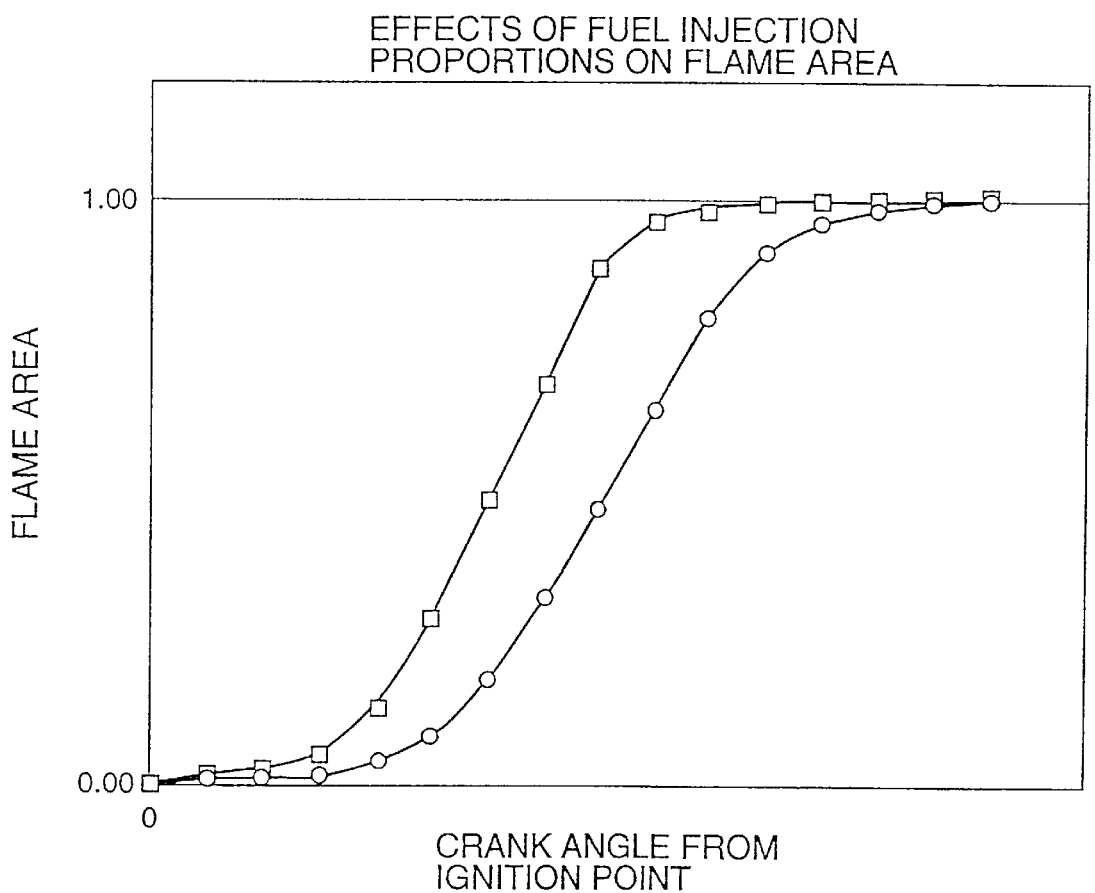
FIG. 11 is a diagram showing variations in flame front area observed when split injection and one-time injection were conducted.

FIG. 11 shows data on variations in the surface area of a flame (or flame front area) in relation to the crank angle from the ignition point observed when intake stroke one-time injection and split injection were made to examine the effects of split injection on the flame front area. As can be seen from this Figure, the flame front area increases rapidly in split injection compared to one-time injection. It can be seen from this that the combustion stability is enhanced and the permissible range of ignition timing retardation is increased.

Figure 12:
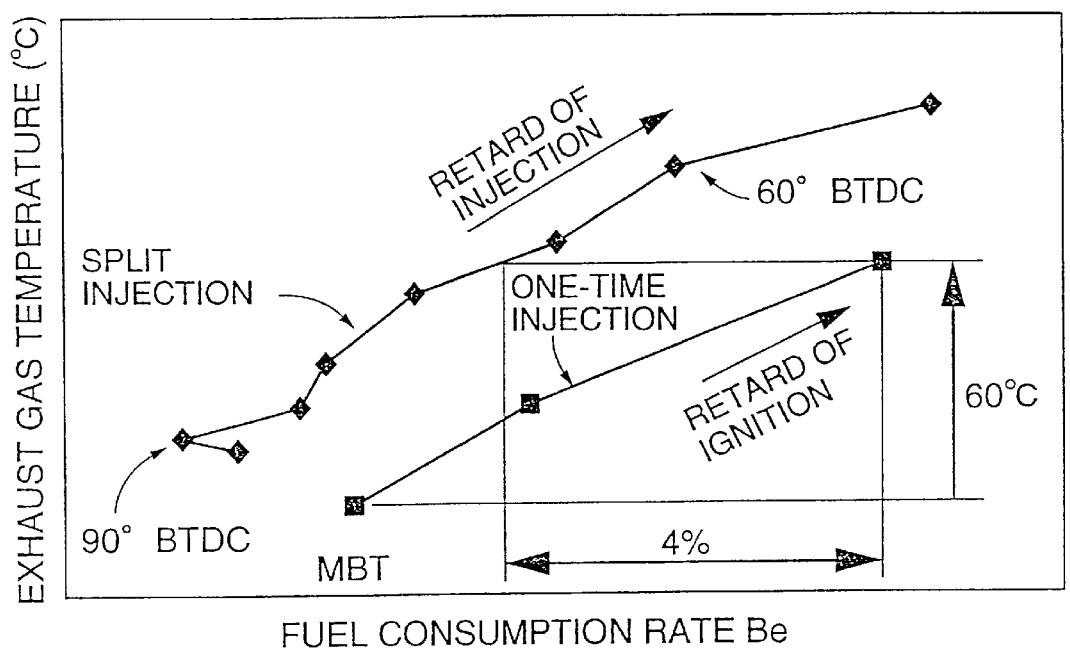
FIG. 12 is a diagram showing exhaust gas temperature and fuel economy rate observed when later injection timing is altered in various ways while performing split injection and when the amount of ignition timing retardation is altered in various ways while performing one-time injection.
Figure 13:
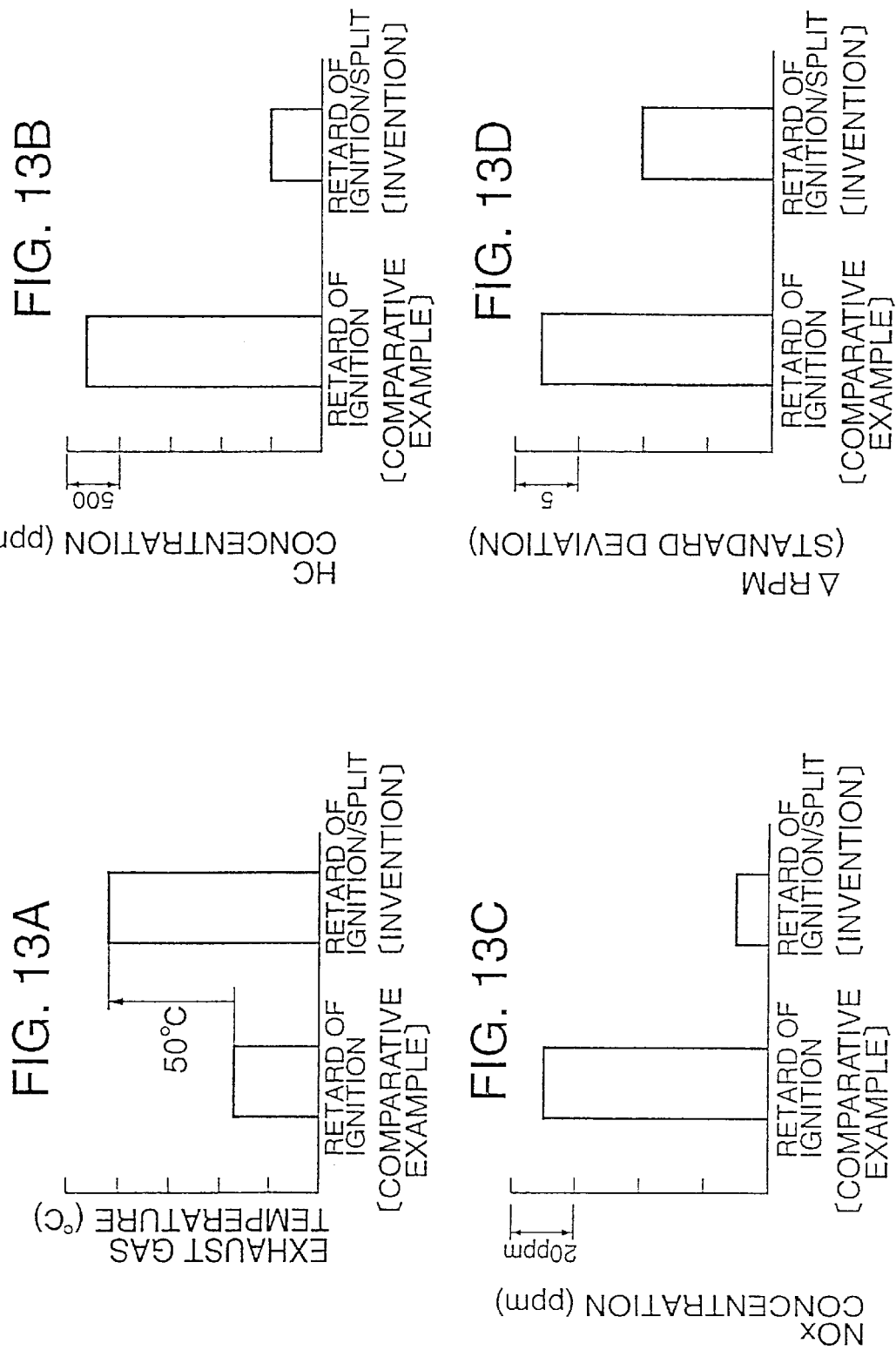
FIGS. 13A to 13D presents graphs showing 13A exhaust gas temperature, 13B HC concentration, 13C NOx concentration and 13D engine speed fluctuation coefficient obtained when split injection and one-time injection were conducted.

FIG. 12 shows variations in fuel economy rate and exhaust gas temperature observed when the later injection timing is altered with the ignition timing varied from the point of MBT to a retarding side in intake stroke one-time injection and with the ignition timing set to the point of MBT in split injection. Operating conditions used were an engine speed of 1500 rpm and a brake mean effective pressure (Pe) of 294 kPa. As can be seen from this Figure, the exhaust gas temperature increases and the fuel economy rate deteriorates as the injection timing is progressively retarded in the case of intake stroke one-time injection. On the other hand, the exhaust gas temperature increases and the fuel economy rate deteriorates as the later injection timing is progressively retarded from about 90° BTDC (before the top dead center) on the compression stroke in the case of split injection.

A comparison of these cases indicates that the fuel economy rate is decreased in split injection when the exhaust gas temperature is the same. (The exhaust gas temperature increases by 60° C. when the injection timing is retarded from the point of MBT in intake stroke one-time injection, for example.) To summarize, the exhaust gas temperature can be more increased by retarding the ignition timing in split injection than in one-time injection provided that the deterioration in fuel economy is kept approximately to the same level. Furthermore, it will be possible to increase the exhaust gas temperature to an even greater extent if the ignition timing is retarded while performing the split injection.

FIGS. 13A to 13D show measurement results of exhaust gas temperature, HC and NOx concentrations in exhaust gases released from the combustion chamber and engine speed fluctuation coefficient RPM (standard deviation) taken from a testing of a comparative example in which the ignition timing was retarded in intake stroke one-time injection and of the practical example of the invention in which the ignition timing was retarded in split injection, the testing being conducted with the amount of ignition timing retardation adjusted to equalize the amount of fuel consumption for the two examples (the ignition timing was retarded up to TDC in both the comparative example and the practical example) at an engine speed of 1500 rpm under low-load operating conditions. As can be seen from this Figure, the exhaust gas temperature is significantly more increased, the HC and NOx concentrations are more reduced and the engine speed fluctuation coefficient RPM is more reduced in the practical example of this invention than in the comparative example even under the same operating conditions and at the same amount of fuel consumption.

Reasons for this are supposed to be that the exhaust gas temperature is increased and HC is reduced since burning in the latter part of combustion is slowed down by split injection as described earlier, NOx is reduced because burning of a lean mixture produced by earlier injection becomes a slow combustion process, for instance, the combustion stability is enhanced due to acceleration of burning in the earlier part of the combustion period, and so forth.

As described above, HC and NOx are reduced even when the amount of ignition timing retardation is of the same level and a catalyst quick light-off effect is obtained as a result of an increase in the exhaust gas temperature in the split injection compared to the one-time injection. Further, since the amount of ignition timing retardation can be increased (engine speed fluctuation coefficient RPM is reduced) by an amount corresponding to the increase in the exhaust gas temperature, HC and NOx reduction and catalyst quick light-off effects are further increased.

Figure 14:
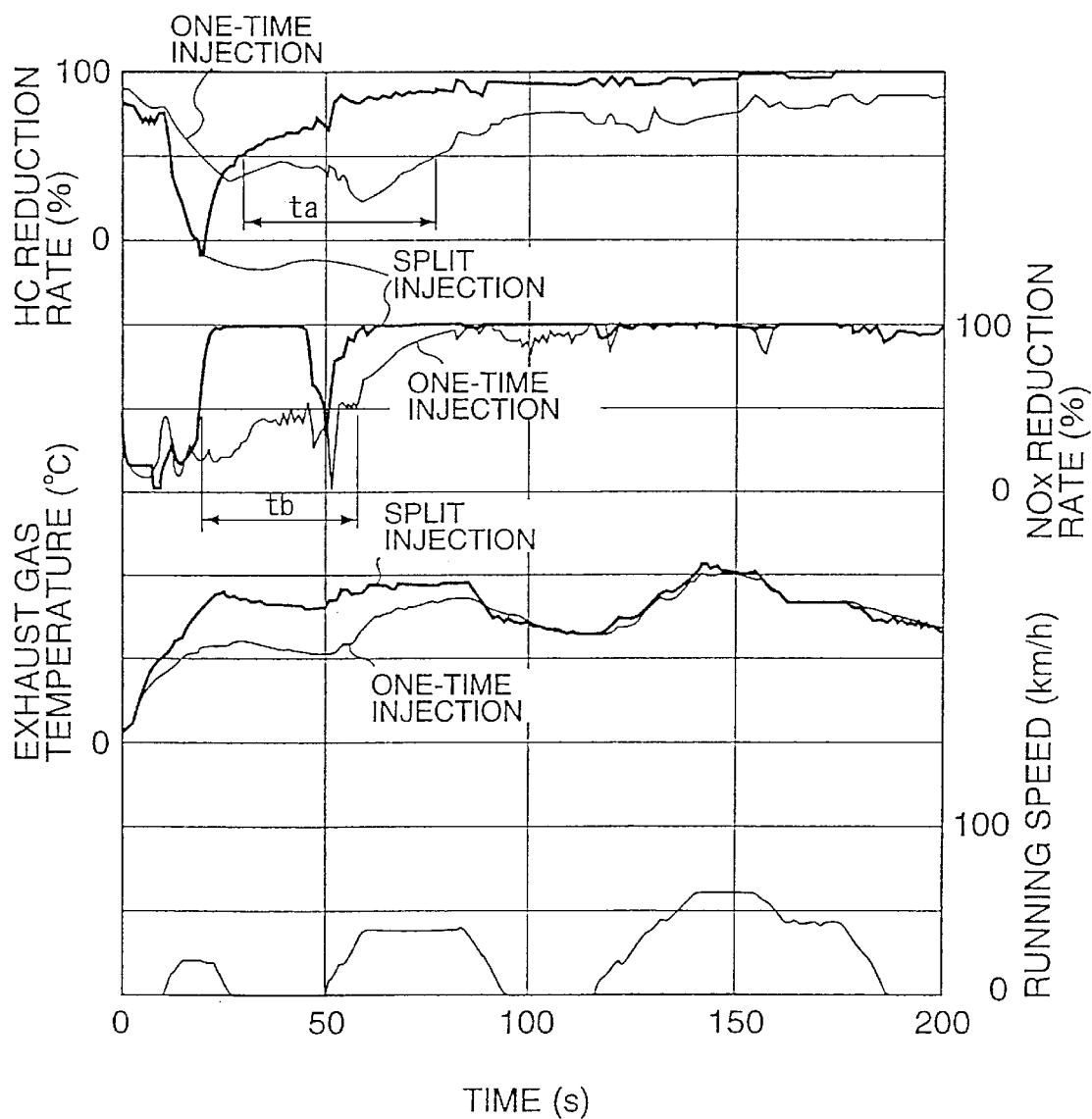
FIG. 14 is a diagram showing variations with time of HC reduction rate, NOx reduction rate, exhaust gas temperature and vehicle running speed on a vehicle-mounted engine.

FIG. 14 shows measurement results of HC reduction rate, NOx reduction rate and exhaust gas temperature taken when one-time injection was conducted in the intake stroke and when split injection was conducted while driving a motor vehicle equipped with the direct injection engine. As can be seen from this Figure, the increase in the exhaust gas temperature is accelerated in the case of split injection compared to the case of intake stroke one-time injection and, as a consequence, periods of time individually required for the HC reduction rate and NOx reduction rate reach 50% are significantly reduced (by ta and tb as illustrated, respectively).

Figure 15:
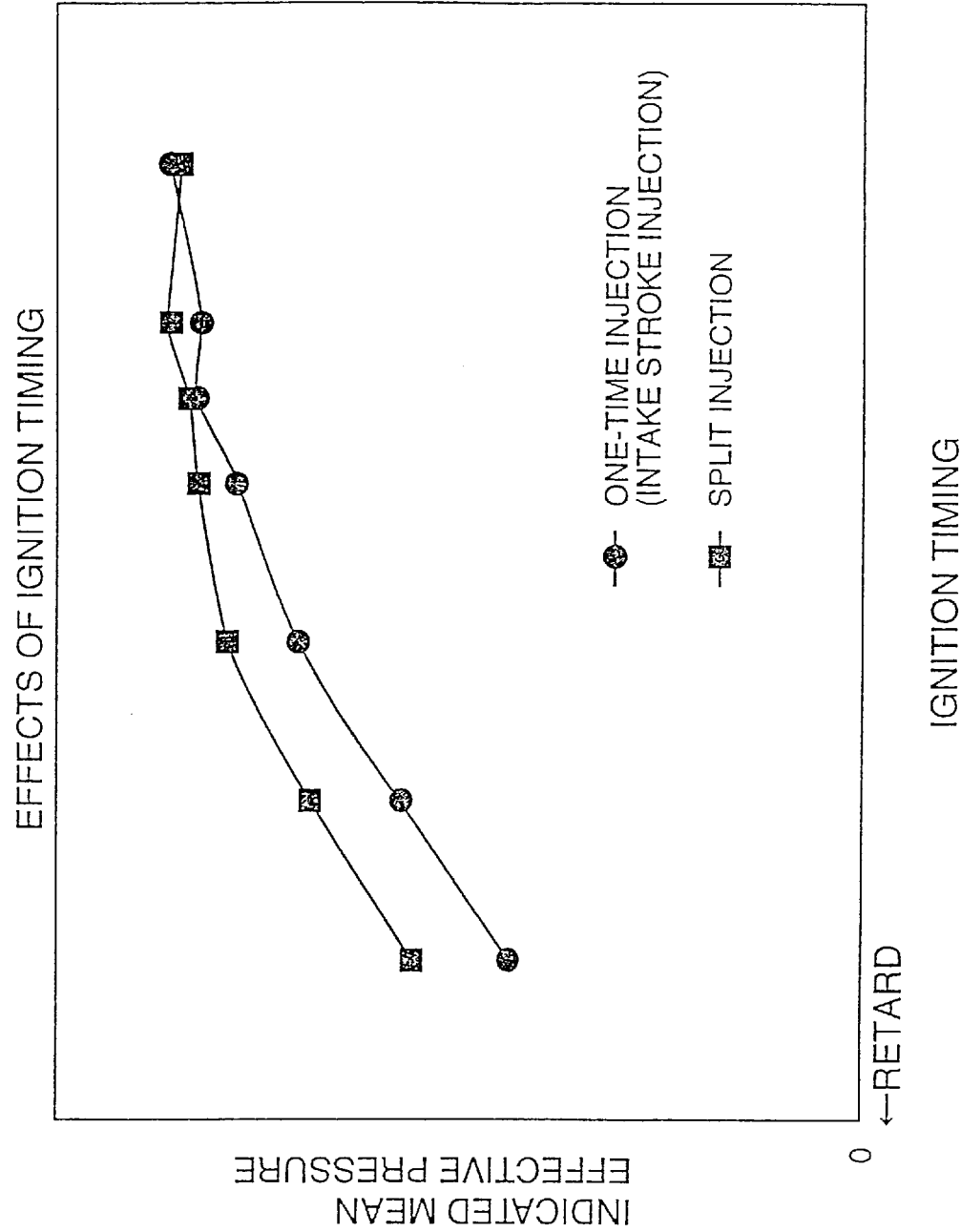
FIG. 15 is a diagram showing the relationship between the ignition timing and indicated mean effective pressure when intake stroke one-time injection was made and when split injection was made.

FIG. 15 shows data on the relationship between the ignition timing and indicated mean effective pressure examined when intake stroke one-time injection was made and when split injection was made. As can be seen from this Figure, although the indicated mean effective pressure (torque) decreased when the ignition timing is retarded, the degree of reduction in the indicated mean effective pressure is smaller in split injection than in intake stroke one-time injection.

It is recognized from the aforementioned data that a reduction in torque and deterioration in fuel economy can be reduced by making split injection and retarding the ignition timing when the catalyst is in its unheated state as in the present invention, compared to a case in which the ignition timing is retarded in one-time injection.

Figure 16:
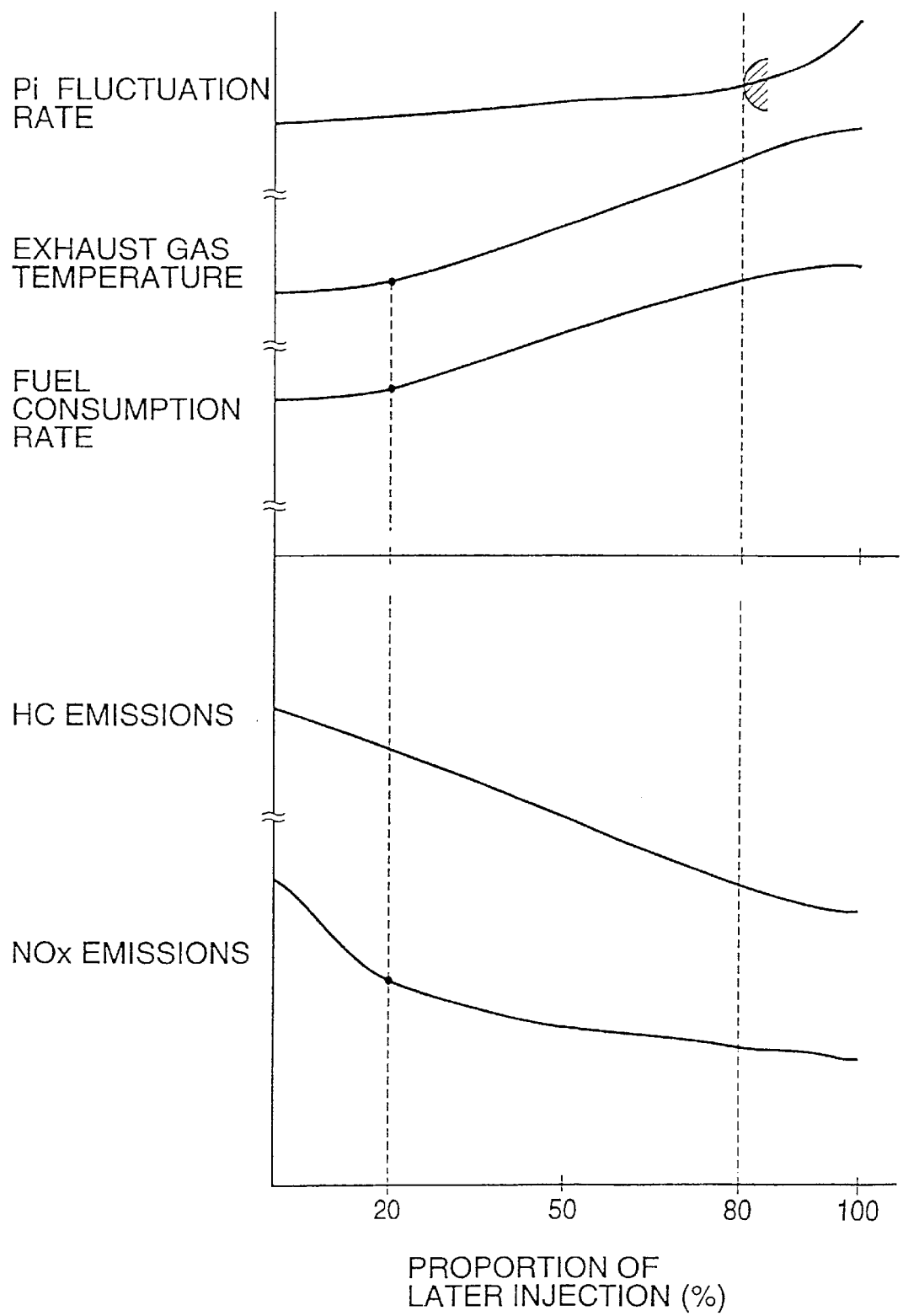
FIG. 16 is a diagram showing variations in Pi fluctuation rate and other parameters observed when the proportion of fuel to be injected by later injection is varied in various ways.

Referring now to FIGS. 16 and 17, desirable ranges of the proportion of fuel to be injected by the later injection and earlier injection and of the timing of the later injection are explained in the following.

FIG. 16 shows data on the relationship among the proportion of fuel to be injected by the later injection (or the ratio of the amount of fuel injected by the later injection to the amount of fuel injected by the earlier injection) and Pi (indicated mean effective pressure) fluctuation rate, exhaust gas temperature, fuel economy rate, the amount of HC emissions and the amount of NOx emissions. Operating conditions used were an engine speed of 1500 rpm, a brake mean effective pressure (Pe) of 294 kPa and an engine cooling water temperature of 40.0° C., in which the ignition timing was retarded to the top dead center (TDC) on compression stroke. As can be seen from this Figure, exhaust gas temperature increasing effects and HC and NOx reduction effects are not sufficiently obtained if the proportion of fuel injected by the later injection is smaller than 20% (1/5). When the proportion of fuel injected by the later injection becomes equal to or larger than 20% (1/5), the exhaust gas temperature increasing effects and the HC and NOx reduction effects increase with an increase in the proportion of fuel injected by the later injection, but the Pi fluctuation rate and fuel economy rate gradually increase. When the proportion of fuel injected by the later injection exceeds 80%, the Pi fluctuation rate exceeds its permissible level and the combustion stability is lost.

Accordingly, it is desirable to keep the proportion of fuel injected by the later injection within a range of 20% to 80% (1/5 to 4/5) in order to maintain the combustion stability and torque while ensuring the exhaust gas temperature increasing effects and HC and NOx reduction effects. When this is accomplished, the proportion of fuel injected by the earlier injection falls within a range of ⅘ to ⅓. In addition, the exhaust gas temperature increasing effects and HC and NOx reduction effects become greater as the proportion of fuel injected by the later injection is increased, that is, as the proportion of fuel injected by the earlier injection is decreased, as long as these proportions fall within the aforementioned ranges. However, the fuel economy rate increases and the permissible range of ignition timing retardation is reduced because the Pi fluctuation rate increases. On the other hand, the higher the proportion of fuel injected by the earlier injection, the lower the fuel economy rate and the lower the Pi fluctuation rate, so that the permissible range of ignition timing retardation is increased.

Under these circumstances, exhaust gas temperature increasing effects and HC and NOx reduction effects can be increased due to a combined effect of the split injection and ignition timing retardation if the combustion stability is increased by setting the amount of fuel injected by the earlier injection to a level equal to or higher than the amount of fuel injected by the later injection (50% or less in terms of the proportion of fuel injected by the later injection) and the amount of ignition timing retardation is increased to or beyond the top dead center of the compression stroke, for example.

In an extreme low-load range, like the idling range, in which the amount of fuel supply to the combustion chamber is small, injection pulselengths corresponding to the divided amounts of injected fuel (or the pulselengths which determine valve-opening periods of the injector) approach a minimum controllable injection pulselength. Accordingly, if the amount of fuel injected by the earlier injection differs from the amount of fuel injected by the later injection, there arises a possibility that the injection pulselength corresponding to the smaller amount of fuel to be injected becomes smaller than the minimum injection pulselength, making it difficult to control the amount of fuel to be injected. In such circumstances, it is desirable to equalize the amount of fuel injected by the later injection and earlier injection (50% of fuel injected by the later injection).

FIG. 17 shows the relationship between later injection start timing and the Pi fluctuation rate and exhaust gas temperature examined under operating conditions of an engine speed of 1500 rpm, a brake mean effective pressure (Pe) of 294 kPa and an engine cooling water temperature of 40.0° C., in which the ignition timing was retarded to the top dead center (TDC) on compression stroke. As can be seen from this Figure, the exhaust gas temperature increasing effects are scarcely obtained when the later injection starting point precedes 120° BTDC. The exhaust gas temperature increasing effects are enhanced when the later injection starting point is retarded to or beyond 120° BTDC. When the Pi fluctuation rate increases and the later injection starting point is retarded beyond 60° BTDC, however, the Pi fluctuation rate exceeds its permissible level and the combustion stability is lost.

If the later injection starting point is set within a range of 120° BTDC to 60° BTDC when the ignition point is retarded to TDC, it is possible to provide appropriate fuel evaporation and atomization times and, as a consequence, the exhaust gas temperature increasing effects are obtained while securing the combustion stability. As it is possible to enhance the exhaust gas temperature increasing effects if the later injection starting point is not retarded up to TDC, the later injection starting point may be set within a range of 120° BTDC to 45° BTDC.

In the extreme low-load range in which the amount of fuel supply to the combustion chamber is small, it is possible to sufficiently retard the injection timing while keeping the later injection starting point in a range not later than 45° BTDC from the viewpoint of fuel evaporation and atomization.

Further, as it is possible to increase the combustion stability by setting the amount of fuel injected by the later injection to a relatively low level (FIG. 16), the later injection starting point can be set within a range of 120° BTDC to 45° BTDC with the ignition timing set to a point beyond the TDC.

According to the catalyst light-off device and the catalyst light-off method using the device of the aforementioned embodiment, two-step split injection including the earlier injection cycle in the period of the intake stroke and the later injection cycle in the middle portion of the compression stroke or later (45° BTDC or later) is performed when the catalyst is in its unheated state, wherein the later injection cycle produces a mixture having local unevenness with mixture masses locally richer than other portions are dispersed in the combustion chamber, for example, and the earlier injection cycle produces a mixture which, when mixed with part of the fuel injected in the latter injection cycle, has a high (lean) air-fuel ratio capable of flame propagation by combustion of the fuel injected in the latter injection cycle. As a consequence, ignition and combustion in the first half of the combustion period is accelerated and the combustion stability is increased while slow burning of the aforementioned mixture having the high (lean) air-fuel ratio in the latter half of the combustion period reduces HC and NOx. Further, as the catalyst quick light-off operation is performed due to the increase in the exhaust gas temperature and the combustion stability is enhanced, the permissible range of ignition timing retardation is increased and the combined effect of the split injection and ignition timing retardation serves to even more increase the HC and NOx reduction and catalyst quick light-off effects.

Since the low-speed, low-load range A shown in FIG. 4 (excluding the idling speed range and no-load range) is a range requiring relatively low torques, the ignition timing is retarded to a large extent to or beyond the top dead center in this range A when the catalyst is in its unheated state, wherein the amount of retardation of the ignition timing is retarded such that the combustion stability is increasingly enhanced toward the high-load side within this range A. This arrangement helps to sufficiently increase the HC and NOx reduction and catalyst quick light-off effects.

In the no-load range in which combustion tends to become unstable, the amount of retardation is decreased such that the ignition point is located ahead of the top dead center, whereby loss of combustion stability due to ignition timing retardation is avoided.

In the range B on the high-load side, the amount of ignition timing retardation is reduced to bring the ignition point close to the MBT or to advance it up to the MBT, so that torques required in the range B on the high-load side are obtained. Although the mode of fuel injection from the injector 11 may be controlled to stay in split injection in the range B on the high-load side, the fuel injection mode may be switched to intake stroke injection in a particularly higher-load region within the range B.

According to the construction shown in FIG. 1 and the control operation shown in the time chart of FIG. 3, it is possible to obtain further operational features and effects which are described below.

As the swirl control valve 17 shown in FIG. 1 is closed at least in the low-load range when the catalyst is not heated yet, it produces a swirl within the combustion chamber 5 and thereby enhances turbulence within the combustion chamber 5. As such turbulence enhancing means like the swirl control valve 17 is provided, the combustion stability is increased by enhancement of turbulence within the combustion chamber when the aforementioned split injection is conducted at least in the low-load range while the catalyst is still in its unheated state. It is therefore possible to maintain the combustion stability while suppressing increase in the Pi fluctuation rate even when the later injection starting point is retarded by a relatively large amount to increase the quick light-off effects in split injection, and the catalyst quick light-off operation is performed even further because the ignition timing retarding limit is increased.

In the control operation shown in the time chart of FIG. 3, the air-fuel ratio is set to a "lean" level during the specified time period ($t_1$ to $t_3$) in which the catalyst temperature is particularly low within the total period when the catalyst is in its unheated state, so that HC and other emissions in the exhaust gases are reduced. Furthermore, there exists excess oxygen when the air-fuel ratio is set to the "lean" level as described above and, and this makes it possible to perform sufficient burning of the fuel injected by split injection and is advantageous for quick light-off. From the specified point in time $t_3$ when the catalyst temperature has increased to a certain extent and the catalyst becomes more or less activated, though it is still in its unheated state, the air-fuel ratio is set to the stoichiometric air-fuel ratio ($\lambda=1$). Consequently, HC and NOx are reduced by the converting effects of the catalyst and its reaction also serves to perform the catalyst quick light-off operation.

The manner of air-fuel ratio control operation is not limited to the foregoing practical example. For example, the air-fuel ratio may be set to a "leaner" level than the stoichiometric air-fuel ratio (but not exceeding 17) during a particular period when the catalyst is in its unheated state, or the air-fuel ratio may be controlled such that it matches the stoichiometric air-fuel ratio from a point in time immediately after engine startup.

The timing of earlier injection in the split injection mode when the catalyst is in its unheated state is not limited to the intake stroke period but may be at any point during the intake stroke or later as long as that point exists prior to the later injection. As an example, the earlier injection may be made during the earlier portion of the compression stroke.

The invention thus far described by way of example provides the following features and advantages.

In a first aspect of the invention, a catalyst light-off method for a direct injection engine having a catalyst provided in an exhaust passage for converting exhaust gases, an injector for injecting fuel directly into a combustion chamber and an ignition device for igniting a mixture in the combustion chamber comprises causing the injector to make at least two-step split injection during a period from an intake stroke to an ignition point when the catalyst is in its unheated state in which its temperature is lower than its activation temperature, the split injection including a later injection cycle which produces a mixture mass having local unevenness in air-fuel ratio in the combustion chamber, and an earlier injection cycle which produces a lean mixture mass having an air-fuel ratio higher than the stoichiometric air-fuel ratio by injecting fuel prior to the later injection cycle, wherein the lean mixture mass is capable of flame propagation by fuel injected in the later injection cycle and combustion thereof and causes main combustion during a main combustion period in which approximately 10% to 90% by mass of the injected fuel is burnt in a combustion process occurring in the combustion chamber, and retarding the ignition point of the ignition device by a specified amount beyond a minimum spark advance for best torque (MBT) when the catalyst is in its unheated state.

A catalyst light-off device for carrying out the catalyst light-off method of the aforementioned first aspect of the invention is constructed as follow.

Specifically, this catalyst light-off device for a direct injection engine having a catalyst provided in an exhaust passage for converting exhaust gases, an injector for injecting fuel directly into a combustion chamber and an ignition device for igniting a mixture in the combustion chamber comprises a temperature state identifier for judging the temperature state of the catalyst, a fuel injection controller for controlling fuel injection from the injector, and an ignition timing controller for controlling an ignition point of the ignition device, wherein the fuel injection controller controls the injector based on judgment results of the temperature state identifier to make at least two-step split injection during a period from an intake stroke to an ignition point when the catalyst is in its unheated state in which its temperature is lower than its activation temperature, the split injection including a later injection cycle which produces a mixture mass having local unevenness in air-fuel ratio, and an earlier injection cycle which produces a lean mixture mass having an air-fuel ratio higher than the stoichiometric air-fuel ratio by injecting fuel prior to the later injection cycle, wherein the lean mixture mass is capable of flame propagation by fuel injected in the later injection cycle and combustion thereof and causes main combustion during a main combustion period in which approximately 10% to 90% by mass of the injected fuel is burnt in a combustion process occurring in the combustion chamber, and the ignition timing controller controls the ignition device in such a way that the ignition point is retarded by a specified amount beyond a minimum spark advance for best torque (MBT) when the split injection is conducted while the catalyst is in its unheated state.

According to the catalyst light-off method and device of the aforementioned first aspect of the invention, the injector makes the split injection when the catalyst is in its unheated state, wherein the later injection cycle produces a mixture having local unevenness in the combustion chamber, creating a condition in which a relatively rich mixture mass exists at least locally around a spark plug. As a result, ignitability and combustibility in a first half of the combustion period are increased, and the fuel injected in the earlier injection cycle is mixed with part of the fuel injected in the later injection cycle, creating a uniform and lean mixture mass capable of flame propagation by combustion of the fuel injected in the later injection cycle. This lean mixture mass is slowly burnt in the latter half of the combustion period.

Consequently, HC and NOx in the exhaust gases discharged from the combustion chamber are reduced and the exhaust gas temperature increases, resulting in performance of the catalyst quick light-off operation. Furthermore, it becomes possible to set a greater amount of ignition timing retardation due to the increase in combustibility, and the HC and NOx reduction and catalyst quick light-off effects are increased due to a combined effect of the aforementioned split injection and ignition timing retardation.

In the aforementioned first aspect of the invention, it is preferable to perform the later injection cycle during the compression stroke and the earlier injection cycle during the intake stroke in the split injection conducted when the catalyst is in its unheated state. With this arrangement, it is possible to satisfactorily achieve a condition in which a mixture having local unevenness is produced in the combustion chamber by the later injection cycle and a lean mixture mass suited to slow burning is produced by the earlier injection cycle.

In particular, if the later injection cycle is performed during the middle portion of the compression stroke, production of the mixture having local unevenness can be done efficiently. Furthermore, it is preferable to cause the later injection cycle to begin before three-fourths of the period of the compression stroke elapses. This is because the combustion stability will be lost if the later injection start timing is retarded beyond that point in time.

While a mixture having local unevenness is produced in the combustion chamber by performing the later injection cycle in the compression stroke as described above, such unevenness in mixture concentration is created not only when the mixture is stratified around the spark plug but also in an engine in which the mixture is stratified in a positive way. Specifically, an engine may be constructed such that the piston which is fitted in a cylinder bore of the engine and forms a bottom side of the combustion chamber is a flat piston having no cavity for capturing a mixture for stratified charge formation and the combustion chamber has a structure suited for dispersing the injected fuel. This construction creates a condition in which mixture masses locally richer than other portions are scattered in the combustion chamber, ensuring satisfactory ignitability and combustibility.

Further, it is advantageous to set the air-fuel ratio in the entire combustion chamber to fall within a range of 13 to 17 and the amount of fuel injected in the earlier injection cycle to ⅕ or above of the total amount of the injected fuel so that a lean mixture having a higher air-fuel ratio than the stoichiometric air-fuel ratio is produced when the catalyst is in its unheated state. With this arrangement, a uniform and lean mixture mass is produced by the fuel injected in the earlier injection cycle and this lean mixture mass becomes capable of flame propagation by the fuel injected in the later injection cycle and combustion thereof, so that slow burning in the latter half of the combustion stroke is made in an effective way. A reason why the air-fuel ratio is to be set within the range of 13 to 17 is that a high heat release rate is obtained in this range and it is possible to use an air-fuel ratio capable of increasing the exhaust gas temperature.

If the amount of fuel injected in the earlier injection cycle is set such that the air-fuel ratio within the combustion chamber obtained by the earlier injection cycle alone becomes equal to or less than 70 in the split injection conducted when the catalyst is in its unheated state, flame propagation caused by combustion of the fuel injected in the later injection cycle is performed effectively in a condition in which the fuel injected at least in the earlier injection cycle and part of fuel injected in the later injection cycle are mixed.

Further, the ignition point may be retarded to or beyond the top dead center of the compression stroke in the low-speed, low-load range in the split injection conducted when the catalyst is in its unheated state. In the low-speed, low-load range in which torque requirements are relatively small, the HC and NOx reduction and catalyst quick light-off effects can be enhanced by retarding the ignition timing to a large extent.

The catalyst light-off method according to the aforementioned first aspect of the invention may be such that the split injection is conducted during the period from the intake stroke to the ignition point in the low-speed, low-load range when the catalyst is in its unheated state, wherein the later injection starting point is set within a period from the middle portion of the compression stroke or later but before three-fourths of the period of the compression stroke elapses, the ignition point is retarded to or beyond the top dead center of the compression stroke at least in part of the low-speed, low-load range, and the air-fuel ratio in the entire combustion chamber is set to fall within a range of 13 to 17. As the split injection is performed effectively and the combustion stability is enhanced due to the split injection in this arrangement as described above, the ignition point can be retarded to a large extent to or beyond the top dead center of the compression stroke in the low-speed, low-load range in which torque requirements are relatively small and, as a consequence, the HC and NOx reduction and catalyst quick light-off effects are enhanced.

When the split injection is performed and the ignition point is retarded to or beyond the top dead center of the compression stroke in the low-speed, low-load range when the catalyst is in its unheated state as described above, the combustion process is likely to become unstable. In this case, the combustion stability can be achieved by setting the ignition point ahead of the top dead center of the compression stroke.

Further, the amount of retardation of the ignition point from the MBT may be progressively increased with an increase in engine load in the low-speed, low-load range when the catalyst is in its unheated state. Since the combustion stability is more increased as the engine load shifts toward the higher-load side within the low-speed, low-load range in which torque requirements are relatively small, the amount of retardation of the ignition point may be increased by a corresponding amount.

Also when the catalyst is in its unheated state, it is preferable to obtain the required torque by progressively decreasing the amount of retardation of the ignition point from the MBT with an increase in engine load in a high-load range of a specified load or over.

A construction of this invention may be such that the earlier injection cycle is performed during the intake stroke and the later injection cycle is performed during the compression stroke in the split injection conducted when the catalyst is in its unheated state, wherein the later injection starting point is set within a period before three-fourths of the period of the compression stroke elapses, the amount of fuel injected in the earlier injection cycle is made equal to larger than the amount of fuel injected in the later injection cycle, and the ignition point is retarded to or beyond the top dead center of the compression stroke in the low-speed, low-load range. When this construction is used, the HC and NOx reduction and catalyst quick light-off effects due to the combined effect of the split injection and ignition timing retardation are increased.

In a second aspect of the invention, a catalyst light-off method for a direct injection engine having a catalyst provided in an exhaust passage for converting exhaust gases, an injector for injecting fuel directly into a combustion chamber and an ignition device for igniting a mixture in the combustion chamber comprises causing the injector to make two-step split injection when the catalyst is in its unheated state in which its temperature is lower than its activation temperature, the split injection including an earlier injection cycle performed during an intake stroke and a later injection cycle performed during a middle portion of a compression stroke or later but before three-fourths of the period of the compression stroke elapses, wherein the air-fuel ratio in the entire combustion chamber is set to fall within a range of 13 to 17 and the amount of fuel injected in the earlier injection cycle is set to fall within a range of about ⅕ to about ⅘ of the total amount of the injected fuel, and retarding the ignition point of the ignition device to or beyond the top dead center of the compression stroke in a low-speed, low-load range excluding an idling speed range and a no-load range.

A catalyst light-off device for carrying out the aforementioned catalyst light-off method of the second aspect of the invention is constructed as follow.

Specifically, this catalyst light-off device for a direct injection engine having a catalyst provided in an exhaust passage for converting exhaust gases, an injector for injecting fuel directly into a combustion chamber and an ignition device for igniting a mixture in the combustion chamber comprises a temperature state identifier for judging the temperature state of the catalyst, a fuel injection controller for controlling fuel injection from the injector, and an ignition timing controller for controlling an ignition point of the ignition device, wherein the fuel injection controller controls the injector based on judgment results of the temperature state identifier to make two-step split injection when the catalyst is in its unheated state in which its temperature is lower than its activation temperature, the split injection including an earlier injection cycle performed during an intake stroke and a later injection cycle performed during a middle portion of a compression stroke or later but before three-fourths of the period of the compression stroke elapses, sets the air-fuel ratio in the entire combustion chamber to fall within a range of 13 to 17, and sets the amount of fuel injected in the earlier injection cycle to fall within a range of about $1/5$ to about $4/5$ of the total amount of the injected fuel when the catalyst is in its unheated state in which its temperature is lower than its activation temperature, and the ignition timing controller retards the ignition point to or beyond the top dead center of the compression stroke in a low-speed, low-load range based on a temperature state of the catalyst and a load condition when the split injection is injection is while the catalyst is in its unheated state.

According to the catalyst light-off method and device of the aforementioned second aspect of the invention, the split injection including the earlier injection cycle in the intake stroke and the later injection cycle in the compression stroke is conducted when the catalyst is in its unheated state, wherein the later injection cycle is performed during the middle portion of the compression stroke or later but before three-fourths of the period of the compression stroke elapses, the air-fuel ratio in the entire combustion chamber is set to fall within the range of 13 to 17 and the amount of fuel injected in the earlier injection cycle is set to fall within the range of about $1/5$ to about $4/5$ of the total amount of the injected fuel. As a consequence, HC and NOx reduction and catalyst quick light-off effects are obtained and the combustion stability is enhanced. Then, the ignition point is correspondingly retarded to a large extent in the low-speed, low-load range so that the aforementioned effects are increased due to a combined effect.

In the aforementioned second aspect of the invention, it is advantageous in improving the combustion stability, for instance, if the amount of fuel injected in the earlier injection cycle of the split injection is made equal to or larger than the amount of fuel injected in the later injection cycle and the amount of fuel injected in the later injection cycle is made equal to or larger than $1/5$ of the total amount of the injected fuel when the catalyst is in its unheated state.

In a third aspect of the invention, a catalyst light-off method for a direct injection engine having a catalyst provided in an exhaust passage for converting exhaust gases, an injector for injecting fuel directly into a combustion chamber and an ignition device for igniting a mixture in the combustion chamber is such that uniform combustion is made by causing the injector to inject the fuel during an intake stroke in a low-speed, low-load range when the catalyst is in its heated state in which its temperature is equal to or higher than its activation temperature, whereas the air-fuel ratio in the entire combustion chamber is set to fall within a range of 13 to 17, and the injector is caused to make split injection including an earlier injection cycle performed during the intake stroke to inject about $1/5$ to about $4/5$ of the total amount of the injected fuel and a later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture in the combustion chamber, forming mixture masses locally richer than other portions and scattering them in the combustion chamber, when the catalyst is in its unheated state in which its temperature is lower than its activation temperature, and the ignition point of the ignition device is retarded compared to the ignition point set under the same engine speed and load conditions as when the catalyst is in its heated state.

A catalyst light-off device for carrying out the aforementioned catalyst light-off method of the third aspect of the invention is constructed as follow.

Specifically, this catalyst light-off device for a direct injection engine having a catalyst provided in an exhaust passage for converting exhaust gases, an injector for injecting fuel directly into a combustion chamber and an ignition device for igniting a mixture in the combustion chamber comprises a temperature state identifier for judging the temperature state of the catalyst, a fuel injection controller for controlling fuel injection from the injector, and an ignition timing controller for controlling an ignition point of the ignition device, wherein the fuel injection controller controls fuel injection based on a temperature state and a load condition in such a way that uniform combustion is made by causing the injector to inject the fuel during an intake stroke in a low-speed, low-load range when the catalyst is in its heated state in which its temperature is equal to or higher than its activation temperature, whereas the air-fuel ratio in the entire combustion chamber is set to fall within a range of 13 to 17, and the injector makes split injection including an earlier injection cycle performed during the intake stroke to inject about $1/5$ to about $4/5$ of the total amount of the injected fuel and a later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture in the combustion chamber, forming mixture masses locally richer than other portions and scattering them in the combustion chamber, when the catalyst is in its unheated state in which its temperature is lower than its activation temperature, and the ignition timing controller controls the ignition device such that the ignition point of the engine is retarded compared to the ignition point set under the same engine speed and load conditions as when the catalyst is in its heated state, when the split injection is conducted while the catalyst is in its unheated state.

According to the aforementioned third aspect of the invention, the split injection is conducted in the low-speed, low-load range when the catalyst is in its unheated state, wherein the earlier injection cycle produces a uniform and lean mixture spread in the combustion chamber and the later injection cycle creates unevenness in the mixture in the combustion chamber, so that a condition in which mixture masses locally richer than other portions are scattered in the combustion chamber is obtained and combustion is made in this condition. As a consequence, HC and NOx reduction and catalyst quick light-off effects are achieved and the combustion stability is enhanced. Then, the ignition point is correspondingly retarded so that the aforementioned effects are increased due to a combined effect. After the catalyst has been heated, fuel is injected in the intake stroke and uniform combustion is conducted in the low-speed, low-load range.

In a fourth aspect of the invention, a catalyst light-off method for a direct injection engine having a catalyst provided in an exhaust passage for converting exhaust gases, an injector for injecting fuel directly into a combustion chamber and an ignition device for igniting a mixture in the combustion chamber is such that stratified charge combustion is made by causing the injector to inject the fuel during a compression stroke in a low-speed, low-load range when the catalyst is in its heated state in which its temperature is equal to or higher than its activation temperature, whereas the air-fuel ratio in the entire combustion chamber is set to fall within a range of 13 to 17, and the injector is caused to make split injection including an earlier injection cycle performed during the intake stroke to inject about $1/5$ to about $4/5$ of the total amount of the injected fuel and a later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture, forming locally richer mixture masses in the combustion chamber, when the catalyst is in its unheated state in which its temperature is lower than its activation temperature, and the ignition point of the ignition device is retarded compared to the ignition point set under the same engine speed and load conditions as when the catalyst is in its heated state.

A catalyst light-off device for carrying out the aforementioned catalyst light-off method of the fourth aspect of the invention is constructed as follow.

Specifically, this catalyst light-off device for a direct injection engine having a catalyst provided in an exhaust passage for converting exhaust gases, an injector for injecting fuel directly into a combustion chamber and an ignition device for igniting a mixture in the combustion chamber comprises a temperature state identifier for judging the temperature state of the catalyst, a fuel injection controller for controlling fuel injection from the injector, and an ignition timing controller for controlling an ignition point of the ignition device, wherein the fuel injection controller controls fuel injection based on a temperature state and a load condition in such a way that stratified charge combustion is made by causing the injector to inject the fuel during a compression stroke in a low-speed, low-load range when the catalyst is in its heated state in which its temperature is equal to or higher than its activation temperature, whereas the air-fuel ratio in the entire combustion chamber is set to fall within a range of 13 to 17, and the injector is caused to make split injection including an earlier injection cycle performed during the intake stroke to inject about $1/5$ to about $4/5$ of the total amount of the injected fuel and a later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture, forming locally richer mixture masses in the combustion chamber, when the catalyst is in its unheated state in which its temperature is lower than its activation temperature, and the ignition point of the ignition device is retarded compared to the ignition point set under the same engine speed and load conditions as when the catalyst is in its heated state.

According to the aforementioned fourth aspect of the invention, the split injection is conducted in the low-speed, low-load range when the catalyst is in its unheated state, wherein the earlier injection cycle produces a uniform and lean mixture spread in the combustion chamber and the later injection cycle creates a condition in which unevenness in mixture concentration occurs in the combustion chamber is obtained and combustion is made in this condition. As a consequence, HC and NOx reduction and catalyst quick light-off effects are achieved and the combustion stability is enhanced. Then, the ignition point is correspondingly retarded so that the aforementioned effects are increased due to a combined effect. After the catalyst has been heated, fuel is injected in the compression stroke and stratified charge combustion is conducted in the low-speed, low-load range.

In the aforementioned third and fourth aspects of the invention, it is preferable to commence the later injection cycle of the split injection within a period of 120° BTDC to 45° BTDC of the compression stroke when the catalyst is in its unheated state. Further, the ignition point should preferably be retarded to or beyond the top dead center of the compression stroke in the low-speed, low-load range in the split injection conducted when the catalyst is in its unheated state. These settings serve to increase the HC and NOx reduction and catalyst quick light-off effects.

In each of the foregoing aspects of the invention, it is preferable to control the engine in such a way that its idling speed becomes higher when the catalyst is in its unheated state than when the catalyst is in its heated state. With this arrangement, combustibility in the unheated state of the catalyst and ignition timing retarding limit will be increased due not only to the split injection but also to the increased engine speed, so that the HC and NOx reduction and catalyst quick light-off effects are further increased.

Furthermore, it is preferable to provide turbulence enhancing means for promoting turbulence within the combustion chamber. With this arrangement, the combustion stability and ignition timing retarding limit will be increased by the enhanced turbulence when the split injection is conducted while the catalyst is in its unheated state, so that the HC and NOx reduction and catalyst quick light-off effects are further increased.

INDUSTRIAL APPLICABILITY

As will be understood from the foregoing discussion, HC and NOx emissions are reduced and exhaust gas temperature is increased due to split injection in a direct injection engine according to the invention when a catalyst is in its unheated state in which its temperature is lower than its activation temperature. Further, since combustion stability is increased, ignition timing can be retarded by a corresponding amount. A combined effect of the split injection and ignition timing retardation makes it possible to significantly increase HC and NOx reduction and catalyst quick light-off effects during a period when the catalyst is still in its unheated state.

The HC and NOx reduction and catalyst quick light-off effects in the unheated state of the catalyst can be even more increased especially when the combustion stability is increased by performing a later injection cycle during a middle portion of a compression stroke or later but before three-fourths of the period of the compression stroke elapses, setting the air-fuel ratio in the entire combustion chamber to fall within a range of 13 to 17, and setting the amount of fuel injected in an earlier injection cycle to fall within the range of about 1/5 to about 4/5 of the total amount of the injected fuel, and ignition timing is retarded to or beyond the top dead center of the compression stroke in a specific low-speed, low-load range.

What is claimed is:

1. A catalyst light-off method for a direct injection engine having a catalyst provided in an exhaust passage for converting exhaust gases, an injector for injecting fuel directly into a combustion chamber and an ignition device for igniting a mixture in the combustion chamber the method comprising:

causing the injector to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device, and an earlier injection cycle which produces a lean mixture mass having an air-fuel ratio higher than the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and retarding the ignition point of the ignition device by a specified amount beyond a minimum spark advance for best torque (MBT) when the catalyst is in its unheated state.

2. A catalyst light-off method for a direct injection engine according to claim 1, wherein the later injection cycle is performed during a compression stroke and the earlier injection cycle is performed during the intake stroke in the split injection conducted when the catalyst is in its unheated state, and wherein the later injection cycle is commenced before three-fourths of the period of the compression stroke elapses.

3. A catalyst light-off method for a direct injection engine according to claim 2, wherein the amount of fuel injected in the earlier injection cycle is made equal to larger than the amount of fuel injected in the later injection cycle in the split injection conducted when the catalyst is in its unheated state, and wherein the ignition point is retarded to or beyond the top dead center of the compression stroke in a low-speed, low-load range.

4. A catalyst light-off method for a direct injection engine having a catalyst provided in an exhaust passage for converting exhaust gases, an injector for injecting fuel directly into a combustion chamber and an ignition device for igniting a mixture in the combustion chamber the method comprising:

causing the injector to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device, and an earlier injection cycle which produces a lean mixture mass having an air-fuel ratio higher than the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and retarding the ignition point of the ignition device by a specified amount beyond a minimum spark advance for best torque (MBT) when the catalyst is in its unheated state wherein the earlier injection cycle is performed during the intake stroke and the later injection cycle is performed during a middle portion of a compression stroke or later but before three-fourths of the period of the period of the compression stroke elapses in the split injection, the air-fuel ratio in the entire combustion chamber is set to fall within a range of 13 to 17, and the amount of fuel injected in the earlier injection cycle is set to fall within a range of about 1/5 to about 4/5 of the total amount of the injected fuel when the catalyst is in its unheated state, and wherein the ignition point of the ignition device is retarded to or beyond the top dead center of the compression stroke in a low-speed, low-load range excluding an idling speed range and a no-load range.

5. A catalyst light-off method for a direct injection engine having a catalyst provided in an exhaust passage for converting exhaust gases, an injector for injecting fuel directly into a combustion chamber and an ignition device for igniting a mixture in the combustion chamber the method comprising:

causing the injector to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device, and an earlier injection cycle which produces a lean mixture mass having an air-fuel ratio higher than the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and retarding the ignition point of the ignition device by a specified amount beyond a minimum spark advance for best torque (MBT) when the catalyst is in its unheated state, wherein uniform combustion is made by causing the injector to inject the fuel during the intake stroke in a low-speed, low-load range when the catalyst is in its heated state in which its temperature is equal to or higher than its activation temperature, whereas the air-fuel ratio in the entire combustion chamber is set to fall within a range of 13 to 17, and the injector is caused to make the split injection including the earlier injection cycle performed during the intake stroke to injection about 1/5 to 4/5 of the total amount of the injected fuel and the later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture in the combustion chamber, forming mixture masses locally richer than other portions and scattering them in the combustion chamber, when the catalyst is in its unheated state in which its temperature is lower than its activation temperature, and the ignition point of the ignition device is retarded compared to the ignition point set under the same engine speed and load conditions as when the catalyst is in its heated state.

6. A catalyst light-off device for a direct injection engine having a catalyst provided in an exhaust passage for converting exhaust gases, an injector for injecting fuel directly into a combustion chamber and an ignition device for igniting a mixture in the combustion chamber, catalyst light-off device comprising:

a temperature state identifier for judging the temperature state of the catalyst;

a fuel injection controller for controlling fuel injection from the injector; and an ignition timing controller for controlling an ignition point of the ignition device;

wherein the fuel injection controller controls the injector based on judgment results of the temperature state identifier to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device; and an earlier injection cycle which produces a lean mixture mass having an air-fuel ratio higher the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and the ignition timing controller controls the ignition device in such a way that the ignition point is retarded by a specified amount beyond a minimum spark advance for best torque (MBT) when the split injection is conducted while the catalyst is in its unheated state.

7. A catalyst light-off device for a direct injection engine according to claim 6, wherein the fuel injection controller controls the injector such that the later injection cycle is performed during a compression stroke and the earlier injection cycle is performed during the intake stroke in the split injection conducted when the catalyst is in its unheated state, and wherein the later injection cycle is commenced before three-fourths of the period of the compression stroke elapses.

8. A catalyst light-off device for a direct injection engine according to claim 7, wherein the fuel injection controller makes the amount of fuel injected in the earlier injection cycle equal to larger than the amount of fuel injected in the later injection cycle, and the ignition timing controller retards the ignition point to or beyond the top dead center of the compression stroke in a low-speed, low-load range when the split injection is conducted while the catalyst is in its unheated state.

9. A catalyst light-off device for a direct injection engine having a catalyst provided in an exhaust passage for converting exhaust gases, an injector for injecting fuel directly into a combustion chamber and an ignition device for igniting a mixture in the combustion chamber, catalyst light-off device comprising:

a temperature state identifier for judging the temperature state of the catalyst;

a fuel injection controller for controlling fuel injection from the injector; and an ignition timing controller for controlling an ignition point of the ignition device;

wherein the fuel injection controller controls the injector based on judgment results of the temperature state identifier to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device; and an earlier injection cycle which produces a lean mixture mass having an air-fuel ratio higher the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and the ignition timing controller controls the ignition device in such a way that the ignition point is retarded by a specified amount beyond a minimum spark advance for best torque (MBT) when the split injection is conducted while the catalyst is in its unheated state, wherein a piston which is fitted in a cylinder bore of the engine and forms a bottom side of the combustion chamber is a flat piston having no cavity for capturing a mixture for stratified charge formation, and the later injection cycle of the split injection cycle conducted when the catalyst is in its unheated state creates a condition in which mixture masses locally richer than other portions are scattered in the combustion chamber.

10. A catalyst light-off device for a direct injection engine having a catalyst provided in an exhaust passage for converting exhaust gases, an injector for injecting fuel directly into a combustion chamber and an ignition device for igniting a mixture in the combustion chamber, catalyst light-off device comprising:

a temperature state identifier for judging the temperature state of the catalyst;

a fuel injection controller for controlling fuel injection from the injector; and an ignition timing controller for controlling an ignition point of the ignition device;

wherein the fuel injection controller controls the injector based on judgment results of the temperature state identifier to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device; and an earlier injection cycle which produces a lean mixture mass having an air-fuel ratio higher the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and the ignition timing controller controls the ignition device in such a way that the ignition point is retarded by a specified amount beyond a minimum spark advance for best torque (MBT) when the split injection is conducted while the catalyst is in its unheated state, wherein the fuel injection controller controls the injector based on judgment results of the temperature state identifier to perform the earlier injection cycle during the intake stroke and the later injection cycle during a middle portion of a compression stroke or later but before three-fourths of the period of the compression stroke elapses in the split injection, sets the air-fuel ratio in the entire combustion chamber to fall within a range of 13 to 17, and sets the amount of fuel injected in the earlier injection cycle to fall within a range of about ⅕ to about ⅘ of the total amount of the injected fuel when the catalyst is in its unheated state in which its temperature is lower than its activation temperature, and the ignition timing controller retards the ignition point to or beyond the top dead center of the compression stroke in a low-speed, low-load range based on a temperature state of the catalyst and a load condition when the split injection is conducted while the catalyst is in its unheated state.

11. A catalyst light-off device for a direct injection engine having a catalyst provided in an exhaust passage for converting exhaust gases, an injector for injecting fuel directly into a combustion chamber and an ignition device for igniting a mixture in the combustion chamber, catalyst light-off device comprising:

a temperature state identifier for judging the temperature state of the catalyst;

a fuel injection controller for controlling fuel injection from the injector; and an ignition timing controller for controlling an ignition point of the ignition device;

wherein the fuel injection controller controls the injector based on judgment results of the temperature state identifier to make at least two-step split injection during a period from an intake stroke to an ignition point when the catalyst is in its unheated state in which its temperature is lower than its activation temperature, the split injection including:

a later injection cycle which produces a mixture mass having a plurality of richer mixture portions scattered substantially in the entirety of the combustion chamber to be ignited and burnt by said ignition device; and an earlier injection cycle which produces a lean mixture mass having an air-fuel ratio higher the stoichiometric air-fuel ratio by injecting fuel prior to the later injection cycle, wherein the lean mixture mass causes flame propagation by fuel injected in the later injection cycle and combustion thereof and causes main combustion during a main combustion period in which approximately 10% to 90% by mass of the injected fuel is burnt in a combustion process occurring in the combustion chamber; and the ignition timing controller controls the ignition device in such a way that the ignition point is retarded by a specified amount beyond a minimum spark advance for best torque (MBT) when the split injection is conducted while the catalyst is in its unheated state, wherein the fuel injection controller controls fuel injection based on a temperature state and a load condition in such a way that uniform combustion is made by causing the injector to inject the fuel during the intake stroke in a low-speed, low-load range when the catalyst is in its heated state in which its temperature is equal to or higher than its activation temperature, whereas the air-fuel ratio in the entire combustion chamber is set to fall within a range of 13 to 17, and the injector makes the split injection including the earlier injection cycle performed during the intake stroke to inject about ⅕ to about ⅘ of the total amount of the injected fuel and the later injection cycle performed during a middle portion of a compression stroke or later to inject the remainder of the total amount of the injected fuel in the low-speed, low-load range, wherein the earlier injection cycle produces a uniform and lean mixture in the combustion chamber and the later injection cycle creates unevenness in the mixture in the combustion chamber, forming mixture masses locally richer than other portions and scattering them in the combustion chamber, when the catalyst is in its unheated state in which its temperature is lower than its activation temperature; and the ignition timing controller controls the ignition device such that the ignition point of the engine is retarded compared to the ignition point set under the same engine speed and load conditions as when the catalyst is in its heated state, when the split injection is conducted while the catalyst is in its unheated state.

* * * * *